(12) United States Patent
Lin et al.

(10) Patent No.: US 10,850,258 B2
(45) Date of Patent: Dec. 1, 2020

(54) MODIFIED POROUS COMPOSITE STRUCTURE, METHOD FOR MANUFACTURING THE SAME AND METHOD FOR ABSORBING ORGANIC LIQUID

(71) Applicant: CHUNG YUAN CHRISTIAN UNIVERSITY, Taoyuan (TW)

(72) Inventors: Chia-Her Lin, Hsinchu (TW); Sheng-Han Lo, Chiayi County (TW); Bing-Han Li, Tainan (TW)

(73) Assignee: CHUNG YUAN CHRISTIAN UNIVERSITY, Taoyuan (TW)

( * ) Notice: Subject to any disclaimer, the term of this patent is extended or adjusted under 35 U.S.C. 154(b) by 35 days.

(21) Appl. No.: 16/254,596

(22) Filed: Jan. 23, 2019

(65) Prior Publication Data

US 2019/0336939 A1    Nov. 7, 2019

(30) Foreign Application Priority Data

May 2, 2018  (TW) .............................. 107114921 A

(51) Int. Cl.
*B01J 20/22* (2006.01)
*C08G 12/32* (2006.01)
(Continued)

(52) U.S. Cl.
CPC ....... *B01J 20/226* (2013.01); *B01J 20/28045* (2013.01); *B01J 20/3085* (2013.01); *C02F 1/285* (2013.01); *C08G 12/32* (2013.01); *C08J 9/42* (2013.01); *C09K 3/32* (2013.01); *C02F 2101/32* (2013.01); *C02F 2103/08* (2013.01); *C08J 2361/28* (2013.01)

(58) Field of Classification Search
CPC .................. B01J 20/226; B01J 20/3085; B01J 20/28045; C09K 3/32; C08G 12/40; C08G 12/32; C08J 9/36; C08J 2361/32; C08J 9/42; C08J 2361/28; C02F 1/40; C02F 1/285; C02F 2101/32; C02F 2103/08; C02F 1/288
See application file for complete search history.

(56) References Cited

U.S. PATENT DOCUMENTS

| | | | |
|---|---|---|---|
| 2016/0256849 A1* | 9/2016 | Xiao | ................... B01J 20/28045 |
| 2017/0158837 A1* | 6/2017 | Zhang | ................ B01J 20/28076 |

* cited by examiner

*Primary Examiner* — Taiwo Oladapo
(74) *Attorney, Agent, or Firm* — CKC & Partners Co., LLC

(57) ABSTRACT

A method for manufacturing a modified porous composite structure includes steps as follows. A functionalized melamine sponge is provided, a porous organic framework source is provided, a connecting step is conducted, and a modifying step is conducted. The porous organic framework source includes a porous organic framework or a precursor of the porous organic framework. The porous organic framework and the precursor of the porous organic framework include a plurality of first ligands. Each first ligand includes at least one tetrazine group. In the connecting step, the functionalized melamine sponge is combined with the porous organic framework, so that a porous composite structure is obtained. In the modifying step, a reactive group of a modifying group donor is reacted with the tetrazine group, so that a modifying group of the modifying group donor is connected to the porous composite structure to obtain the modified porous composite structure.

15 Claims, 8 Drawing Sheets
(2 of 8 Drawing Sheet(s) Filed in Color)

(51) Int. Cl.
    *C08J 9/42*         (2006.01)
    *B01J 20/28*      (2006.01)
    *C09K 3/32*       (2006.01)
    *C02F 1/28*        (2006.01)
    *B01J 20/30*      (2006.01)
    *C02F 103/08*     (2006.01)
    *C02F 101/32*     (2006.01)

MODIFIED POROUS COMPOSITE STRUCTURE, METHOD FOR MANUFACTURING THE SAME AND METHOD FOR ABSORBING ORGANIC LIQUID

RELATED APPLICATIONS

This application claims priority to Taiwan Application Serial Number 107114921, filed May 2, 2018, which is herein incorporated by reference.

BACKGROUND

Technical Field

The present disclosure relates to a modified porous composite structure, a method for manufacturing the same and a method for absorbing organic liquid. More particularly, the present disclosure relates to a modified porous composite structure using a functionalized melamine sponge and a porous organic framework source containing a tetrazine group as reactants, a manufacturing method thereof, and a method for absorbing organic liquid.

Description of Related Art

With the vigorous development of technology and industry, the organic liquid produced during the manufacturing process in the factory is often discharged without proper treatment, causing the pollution of the water source. Moreover, oceans cover three quarters of the Earth's surface and have rich, varied and indispensable resource for people. However, with the development of oil and petrochemical industry, it is often reported that the oil tanker runs aground to make the crude oil spill out or that the oil spilled out from the oil drilling platform and the tube, causing the severe marine oil pollution. In addition, the aforementioned industry wastewater containing organic liquid discharged from the factory also could flow into the ocean in view of the water circulation, further causing the marine pollution. Therefore, how to efficiently remove the organic liquid in the water source or marine oil pollution is became the environmental protection issue that concerned by everyone.

The traditional technique for removing marine oil pollution includes the method such as separation, filtration, centrifugation, floatation, and electrochemical method etc., wherein the separation method has the most developmental potential because it is simple, high efficiency, and relatively low cost.

Accordingly, how to develop the excellent super-hydrophobic/super-hydrophilic substance, which has the advantages such as that the simple manufacturing method and that is capable to absorb organic liquid, so as to do benefit to separating the organic liquid and water, further applying on removing the organic liquid in the water source or marine oil pollution, is became the aim of the related scholars and operators.

SUMMARY

According to one aspect of the present disclosure, a method for manufacturing a modified porous composite structure includes steps as follows. A functionalized melamine sponge is provided, wherein the functionalized melamine sponge has a repeat unit represented by Formula (i):

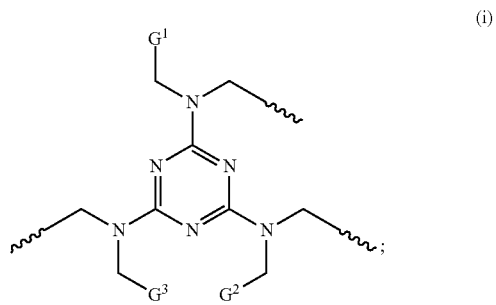

wherein each of $G^1$, $G^2$, $G^3$ independently represents a monovalent organic group including alkenyl groups or alkynyl groups. A porous organic framework source is provided, wherein the porous organic framework source includes a porous organic framework or a precursor of the porous organic framework. The porous organic framework and the precursor of the porous organic framework include a plurality of first ligands, and each of the first ligands includes at least one tetrazine group. A connecting step is conducted, wherein at least one of the $G^1$, the $G^2$, and the $G^3$ is reacted with the tetrazine group, so that functionalized melamine sponge and the porous organic framework are connected, whereby the porous composite structure is obtained. A modifying step is conducted, wherein the porous composite structure is mixed with a modifying group donor. The modifying group donor includes a reactive group and a modifying group, and the reactive group is covalently connected to the modifying group. The reactive group is an alkenyl group, an alkynyl group, an aldehyde group, a ketone group or a combination thereof. The reactive group is reacted with one of the tetrazine groups, so that the modifying group is connected to the porous composite structure to obtain the modified porous composite structure.

According to another aspect of the present disclosure, a modified porous composite structure is provided. The modified porous composite structure is manufactured by the aforementioned method for manufacturing the modified porous composite structure.

According to further another aspect of the present disclosure, a method for adsorbing organic liquid includes steps as follows. The aforementioned modified porous composite structure is contacted with an organic liquid, wherein the modified porous composite structure adsorbs the organic liquid.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DETAILED DESCRIPTION

According to the present disclosure, a group can be a substituted group or an unsubstituted group unless otherwise specified. For example, an "alkyl group" can be a substituted alkyl group or an unsubstituted alkyl group. Moreover, when "Cx" is used to describe a group, it refers that the group has a main chain with X carbon atoms.

According to the present disclosure, the following phrases have identical meanings: "the first ligand can have a structure represented by Formula (I-1)", "the first ligand of Formula (I-1)", and "the first ligand (I-1)". The representations can be applied to other compounds, so that an explanation thereof in this regard will not be provided again.

According to the present disclosure, "the first" and "the second" are used for nomenclature but not for the arrangement order or the use order. For example, "the first ligand" and "the second ligand" are the names of two ligands.

According to the present disclosure, a structure of a compound can be represented by skeleton formula, which means carbon atoms, hydrogen atoms and carbon-hydrogen bonds of the compound can be omitted. However, if functional groups are specifically depicted in the structure of the compound, the structure of the compound adopts the one with specifically depicted functional groups.

Method for Manufacturing Modified Porous Composite Structure

Figures 1, 2:
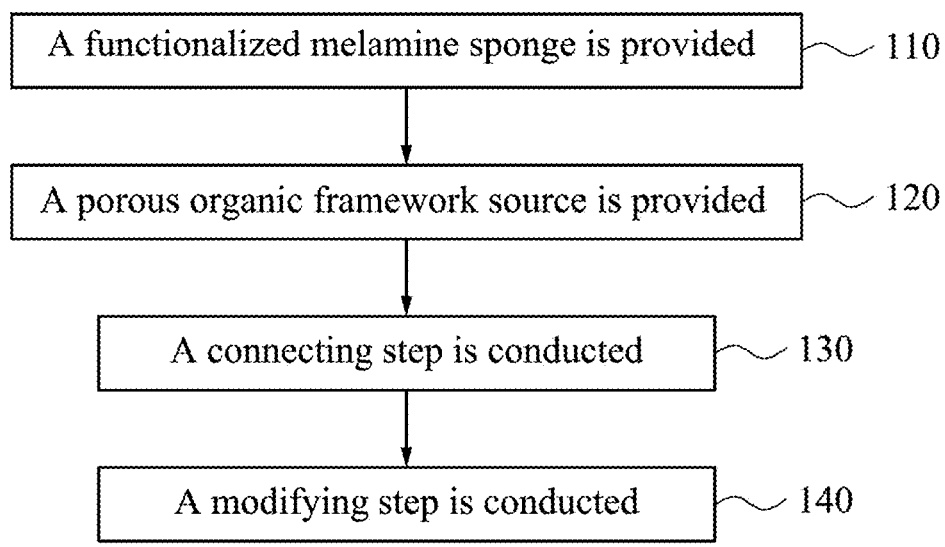
FIG. 1 is a flow diagram showing a method for manufacturing a modified porous composite structure according to one embodiment of the present disclosure.
FIG. 2 is a flow diagram showing a method for absorbing organic liquid according to another embodiment of the present disclosure.

FIG. 1 is a flow diagram showing a method for manufacturing a modified porous composite structure 100 according to one embodiment of the present disclosure. In FIG. 1, the method for manufacturing the modified porous composite structure 100 includes Step 110, Step 120, Step 130, and Step 140.

In Step 110, a functionalized melamine sponge is provided, wherein the functionalized melamine sponge has a repeat unit represented by Formula (i):

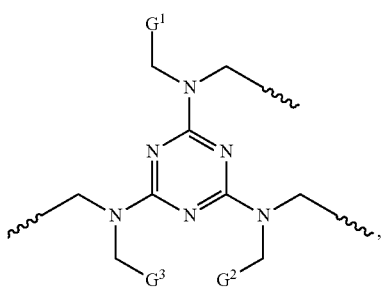

wherein each of $G^1$, $G^2$, $G^3$ independently represents a monovalent organic group including alkenyl groups or alkynyl groups.

In Step 120, a porous organic framework source is provided. The porous organic framework source includes a porous organic framework or a precursor of the porous organic framework. The porous organic framework and the precursor of the porous organic framework include a plurality of first ligands, and each of the first ligands includes at least one tetrazine group.

In Step 130, a connecting step is conducted, wherein at least one of the $G^1$, the $G^2$, and the $G^3$ is reacted with the tetrazine group, so that the functionalized melamine sponge and the porous organic framework are connected, whereby the porous composite structure is obtained.

In Step 140, a modifying step is conducted. The porous composite structure is mixed with a modifying group donor. The modifying group donor includes a reactive group and a modifying group. The reactive group is covalently connected to the modifying group, and the reactive group is an alkenyl group, an alkynyl group, an aldehyde group, a ketone group or a combination thereof. The reactive group is reacted with one of the tetrazine groups, so that the modifying group is connected to the porous composite structure to obtain the modified porous composite structure.

With the functionalized melamine sponge containing a monovalent organic group including alkenyl groups or alkynyl groups, and the porous organic framework source including the tetrazine groups, the functionalized melamine sponge is connected with the porous organic framework to form the porous composite structure through a click reaction. With the porous organic framework source including the tetrazine groups which is not reacted in the aforementioned reaction, and the reactive groups of the modifying group donor being alkenyl groups, alkynyl groups, aldehyde groups, a ketone groups or a combination thereof, the porous composite structure can be modified with the modifying groups through a click reaction again to obtain the modified porous composite structure. Therefore, the steps of the method for manufacturing of modified porous composite structure 100 according to the present disclosure are simple and favorable for providing the modified porous composite structure with needed properties. For example, when the modifying group is a hydrophobic group, the modified porous composite structure is given to being hydrophobic which is favorable for absorbing the organic liquid so as to be applicable on removing the organic liquid in water source or the marine oil pollution. Moreover, the porous composite structure is modified by the modified group via the tetrazine groups of the porous organic framework, so the modified porous composite structure according to the present disclosure also can be regarded as the combination of the functionalized melamine sponge with the modified porous organic framework.

The detail of the method for manufacturing the modified porous composite structure 100 is described as follow.

In Step 110, the functionalized melamine sponge can refer that a melamine sponge is functionalized to obtain reactive functional groups (i.e., the $G^1$, the $G^2$, and the $G^3$ in formula (i)) for reacting to the porous organic framework. The melamine sponge includes the porous network structure of melamine, and can be a commercially available melamine sponge, that is those products made from melamine, for example, the melamine sponge manufactured by BASF, Germany. Moreover, the molecular weight of the functionalized melamine sponge is ranged from 3000 g/mol to 20000 g/mol. For example, the functionalized melamine sponge has a repeat unit represented by Formula (i-1), or Formula (i-2):

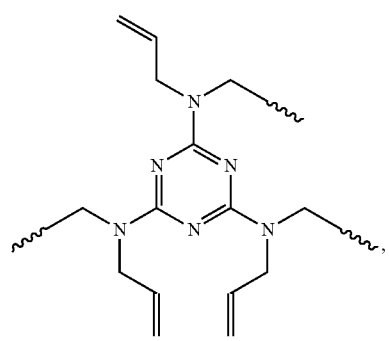
(i-1)

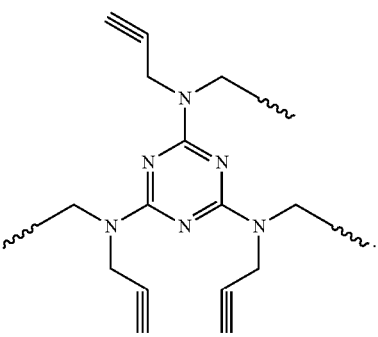
(i-2)

In Step 120, the porous organic framework can be a metal organic framework (MOF) or a covalent organic framework (COF).

When the porous organic framework is the metal organic framework, the porous organic framework includes the first ligands and a plurality of metal clusters. Each of the first ligands can have, but is not limited to, a structure represented by Formula (I-1), Formula (I-2), Formula (I-3), Formula (I-4) or Formula (I-5):

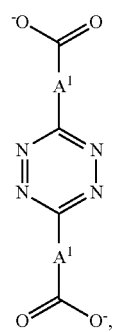
(I-1)

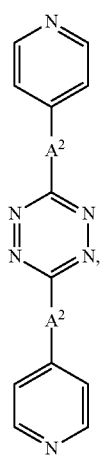
(I-2)

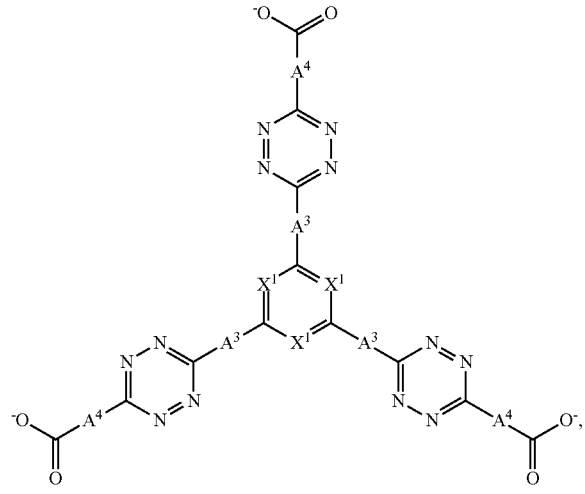
(I-3)

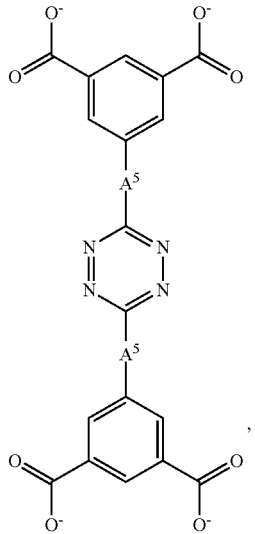
(I-4)

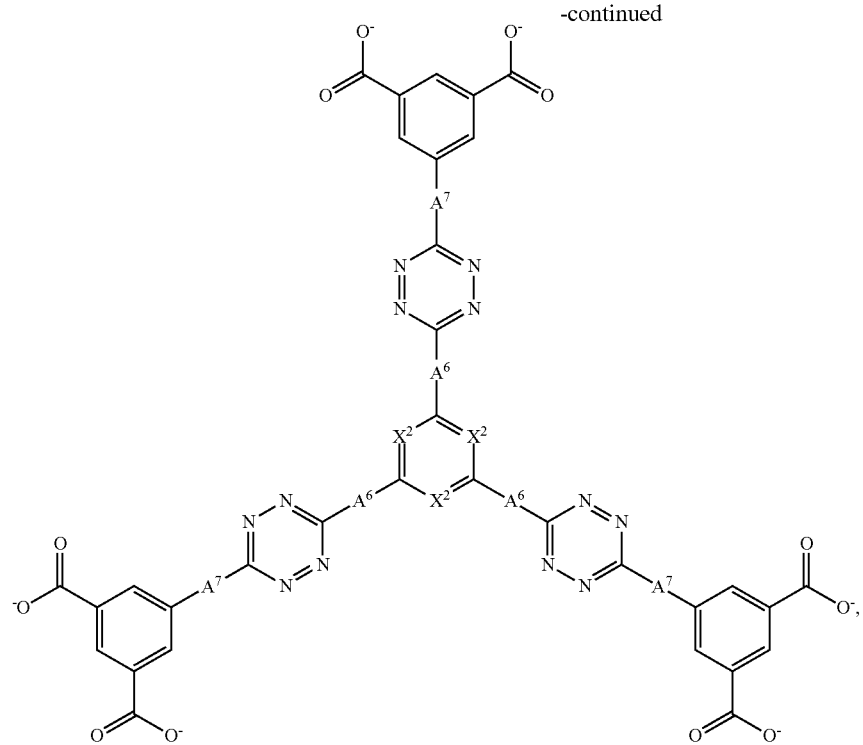
wherein each of $A^1, A^2, A^3, A^4, A^5, A^6$ and $A^7$ independently represents a single bond or a divalent organic group, and each of $X^1$ and $X^2$ independently represents N or C.
The first ligand (I-1) can have, but is not limited to, a structure represented by one of Formula (I-1-1) to Formula (I-1-13):
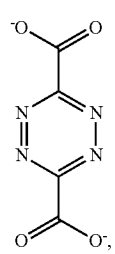
(I-1-1)
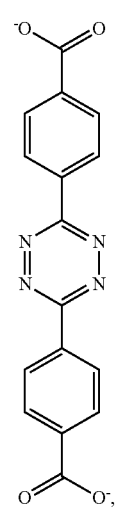
(I-1-2)

-continued
(I-1-3)
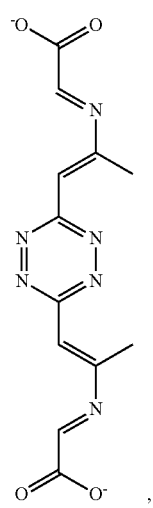
(I-1-4)
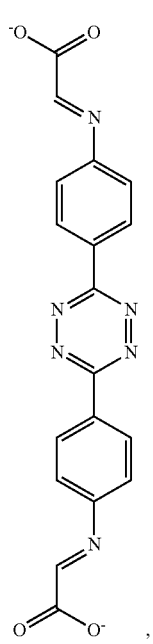
(I-1-5)
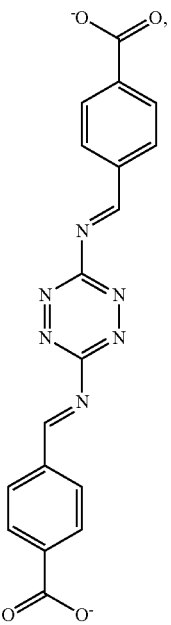
(I-1-6)
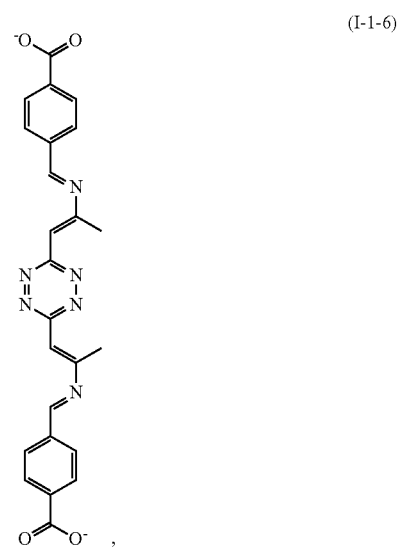

(I-1-7)
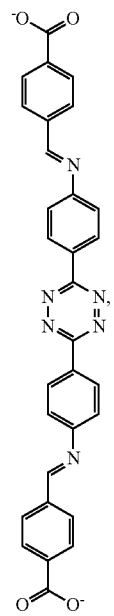
(I-1-8)
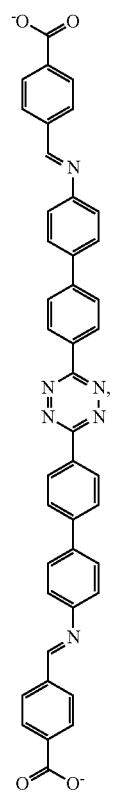
(I-1-9)
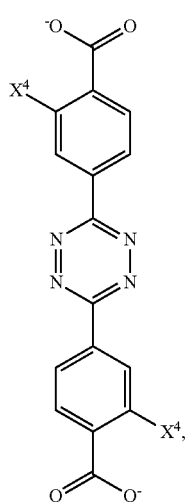
(I-1-10)
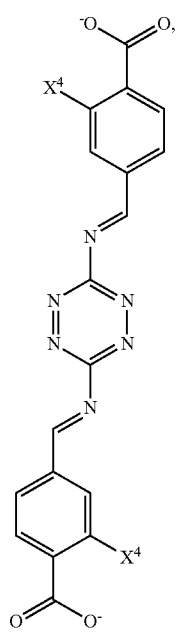
(I-1-11)
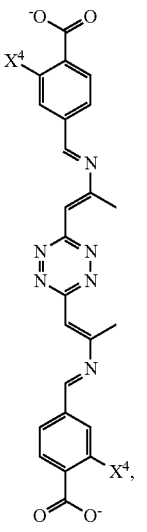

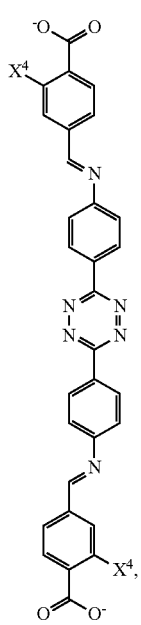
(I-1-12)
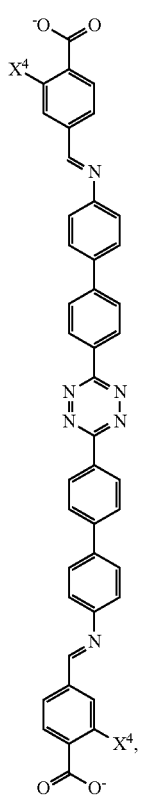
(I-1-13)
wherein each of $X^4$ independently represents a hydroxyl group (—OH) or a thiol group (—SH).
The first ligand (I-2) can have, but is not limited to, a structure represented by one of Formula (I-2-1) to Formula (I-2-5):
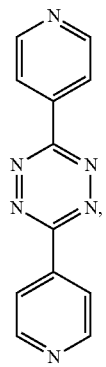
(I-2-1)
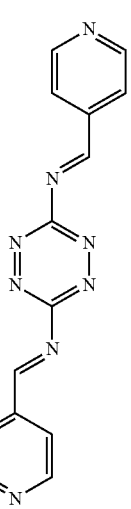
(I-2-2)
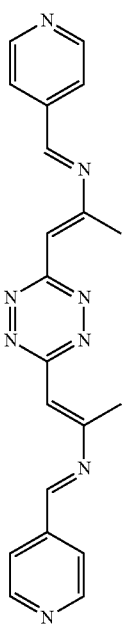
(I-2-3)

(I-2-4)
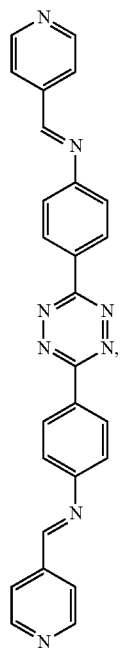
(I-3-1)
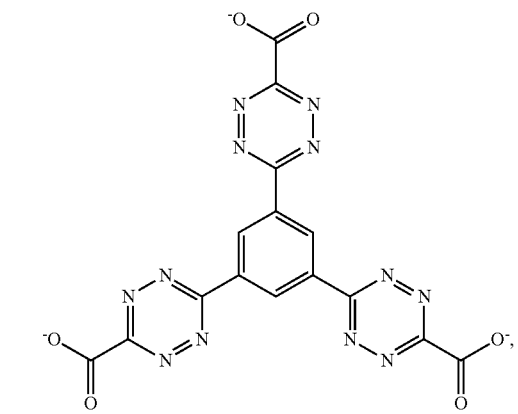
(I-2-5)
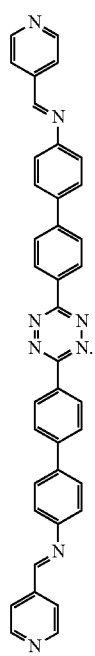
(I-3-2)
(I-3-3)
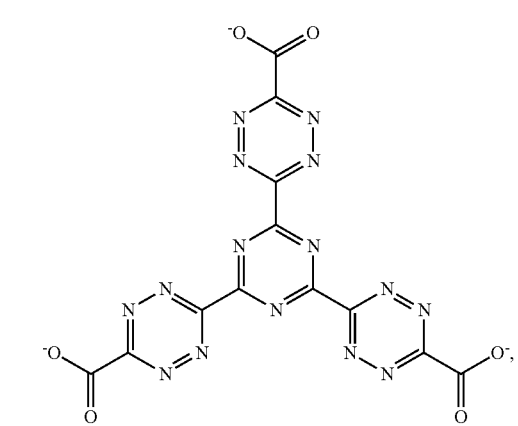
The first ligand (I-3) can have, but is not limited to, a structure represented by one of Formula (I-3-1) to Formula (I-3-6):
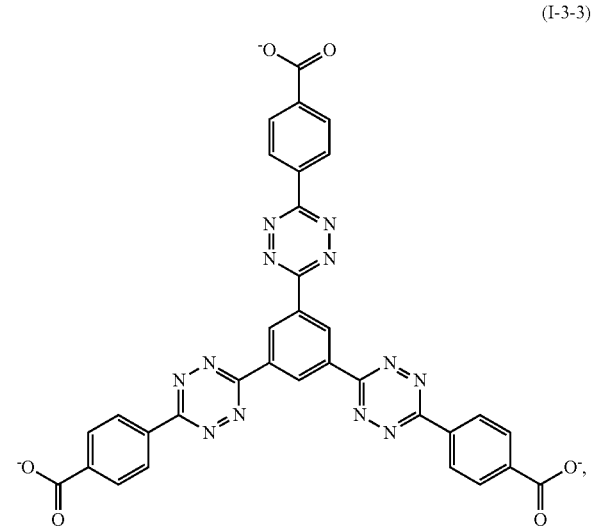

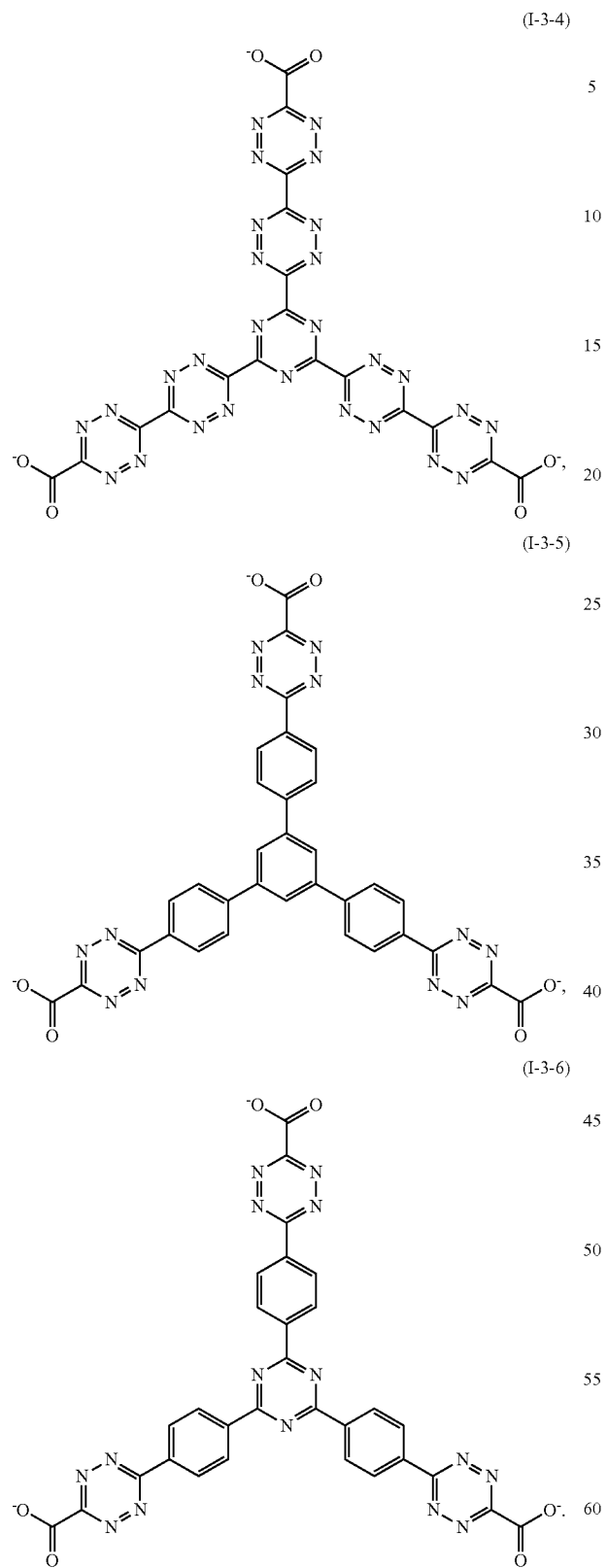
The first ligand (I-4) can have, but is not limited to, a structure represented by one of Formula (I-4-1) to Formula (I-4-3):
The first ligand (I-5) can have, but is not limited to, a structure represented by one of Formula (I-5-1) to Formula (I-5-6):

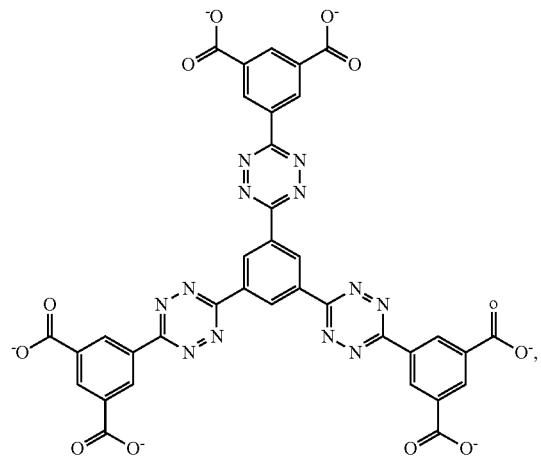
(I-5-1)
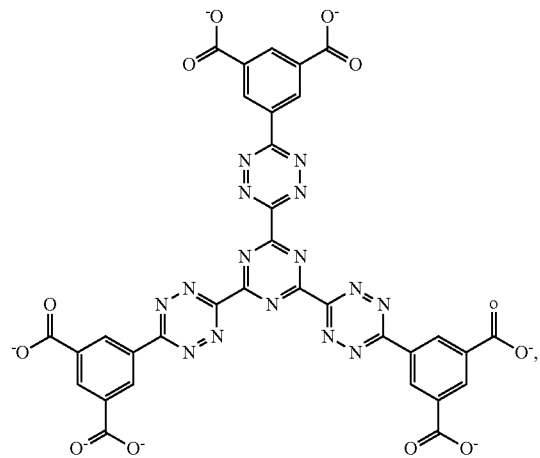
(I-5-2)
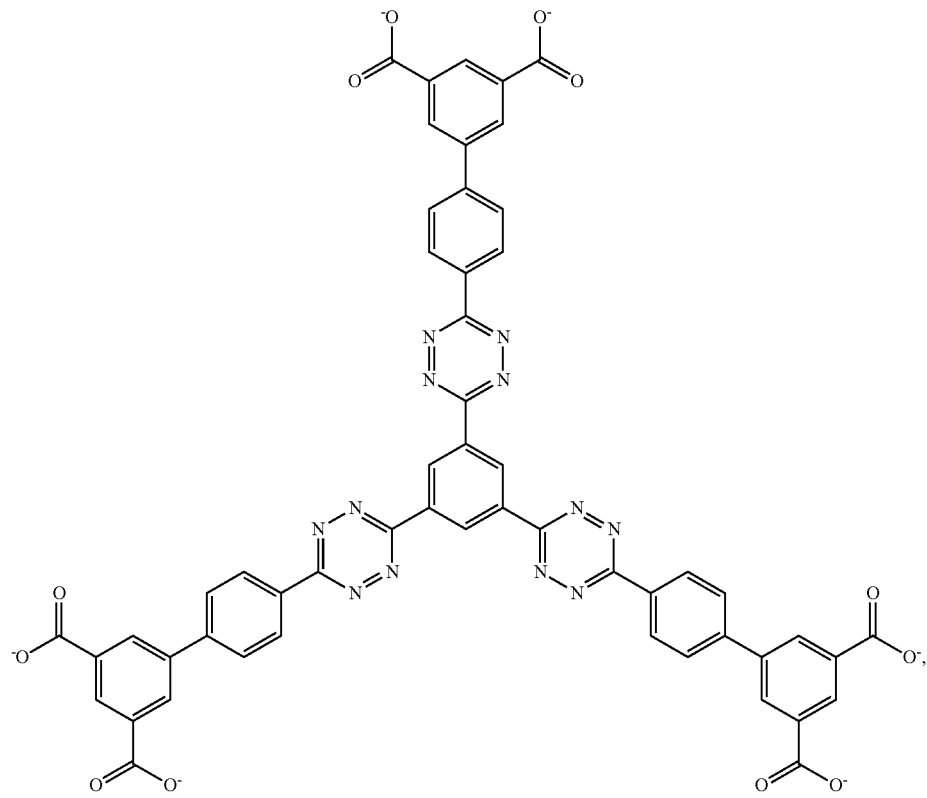
(I-5-3)

-continued
(I-5-4)
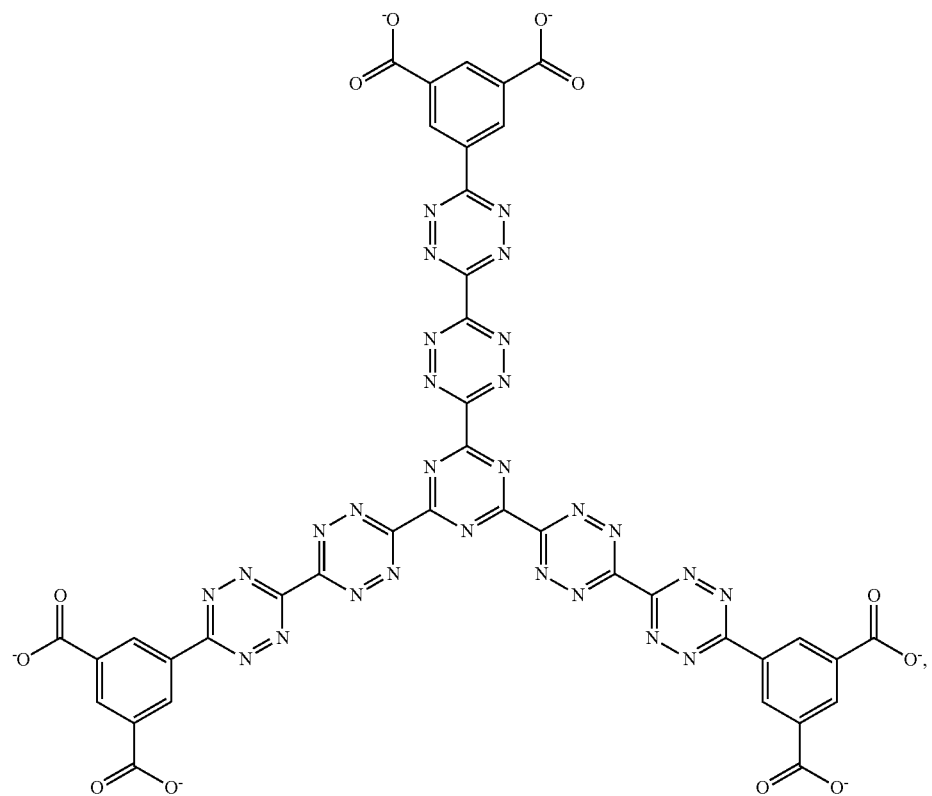
(I-5-5)
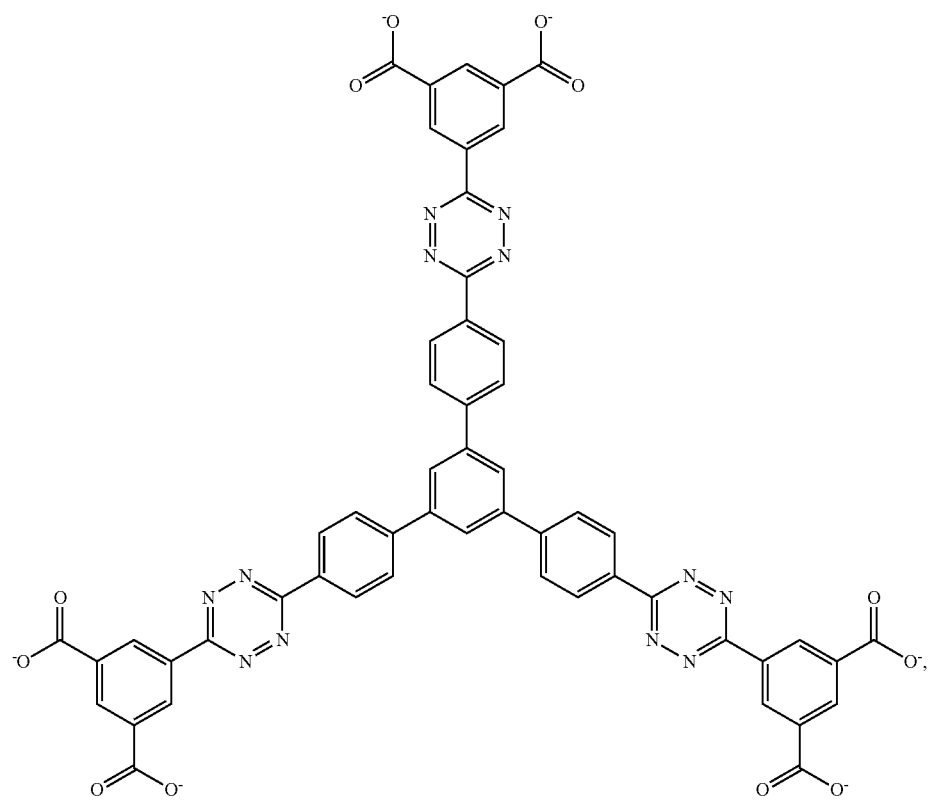

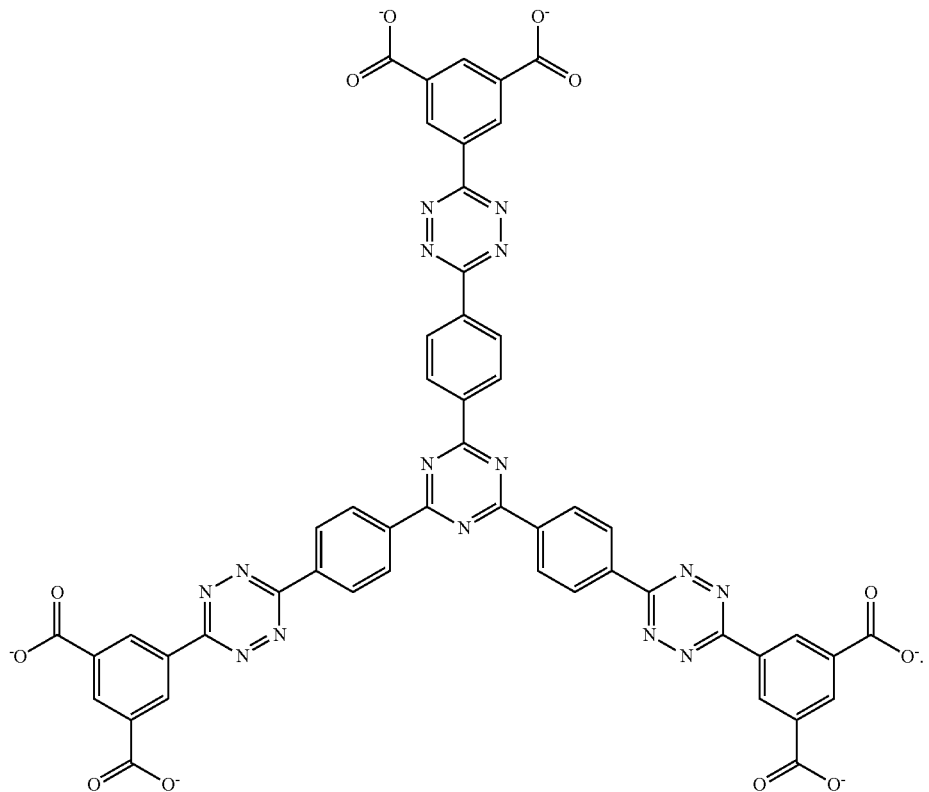

(I-5-6)

Each of the metal clusters includes at least one metal ion. The metal ion can be selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Al^{3+}$, $Ga^{3+}$, $In^{3+}$, $Sc^{3+}$, $Y^{3+}$, $Ti^{4+}$, $Zr^{4+}$, $Hf^{4+}$, $V^{2+}$, $V^{3+}$, $V^{4+}$, $Nb^{3+}$, $Ta^{3+}$, $Cr^{3+}$, $Mo^{3+}$, $Re^{2+}$, $Re^{3+}$, $Mn^{2+}$, $Mn^{3+}$, $Fe^{2+}$, $Fe^{3+}$, $Ru^{2+}$, $Ru^{3+}$, $Os^{2+}$, $Os^{3+}$, $Co^{2+}$, $Co^{3+}$, $Rh^+$, $Rh^{2+}$, $Ir^+$, $Ir^{2+}$, $Ni^+$, $Ni^{2+}$, $Pd^+$, $Pd^{2+}$, $Pt^+$, $Pt^{2+}$, $Cu^+$, $Cu^{2+}$, $Ag^+$, $Au^+$, $Zn^{2+}$, $Cd^{2+}$ and $Hg^{2+}$.

When the porous organic framework is a covalent organic framework, each of the first ligands can be provided by a compound having a structure represented by Formula (II-1), Formula (II-2) or Formula (II-3):

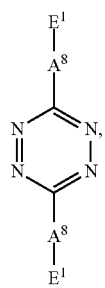

(II-1)

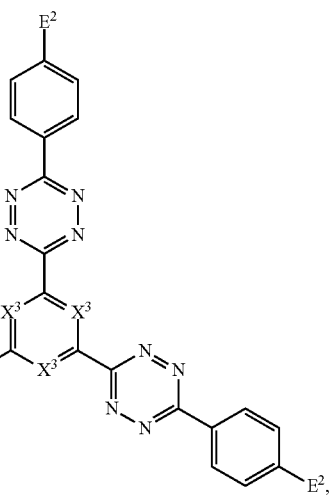

(II-2)

-continued

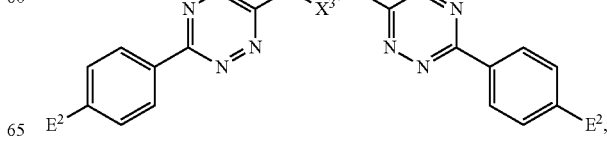

-continued (II-3)

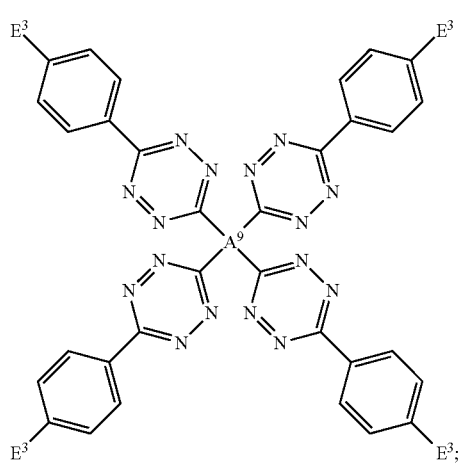

wherein each of A⁸ independently represents a single bond or a divalent organic group, A⁹ represents a tetravalent organic group, each of $E^1$, $E^2$ and $E^3$ independently represents $B(OH)_2$, an amino group or an aldehyde group, and each of $X^3$ independently represents N or C.

The compound (II-1) providing the first ligand can have, but is not limited to, a structure represented by one of Formula (II-1-1) to Formula (II-1-2):

(II-1-1)

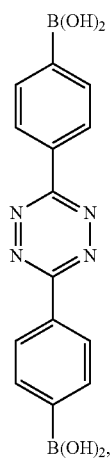

(II-1-2)

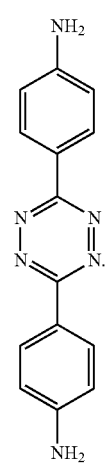

The compound (II-2) providing the first ligand can have, but is not limited to, a structure represented by one of Formula (II-2-1) to Formula (II-2-4):

(II-2-1)

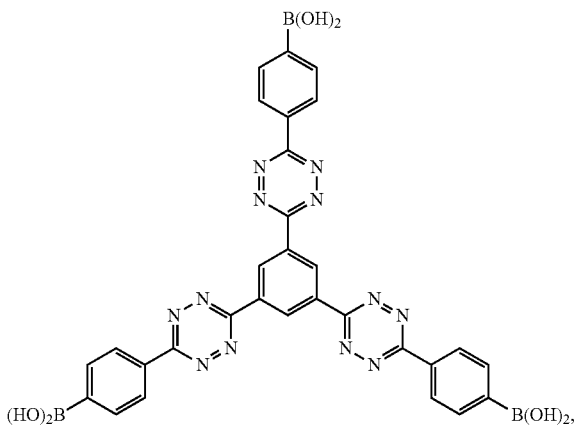

(II-2-2)

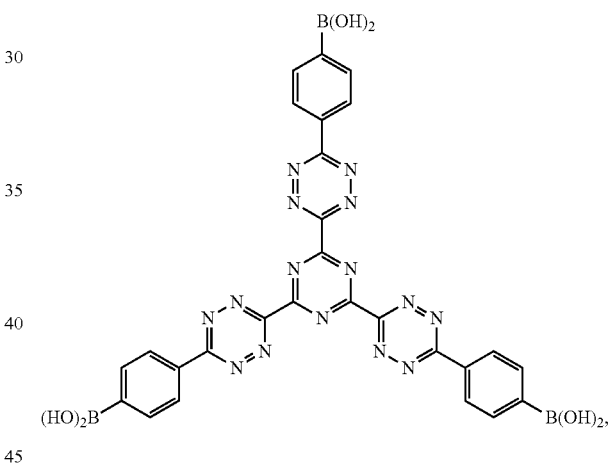

(II-2-3)

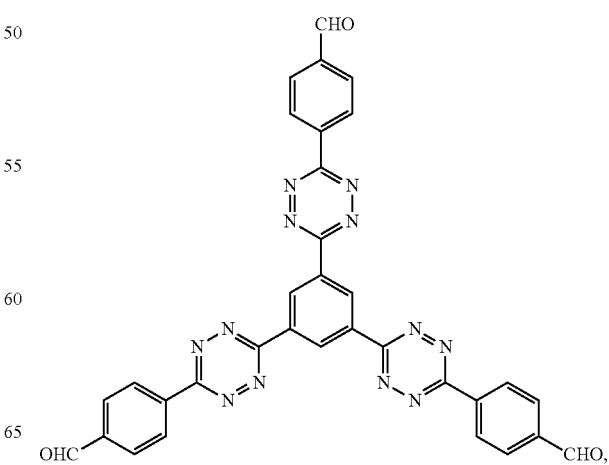

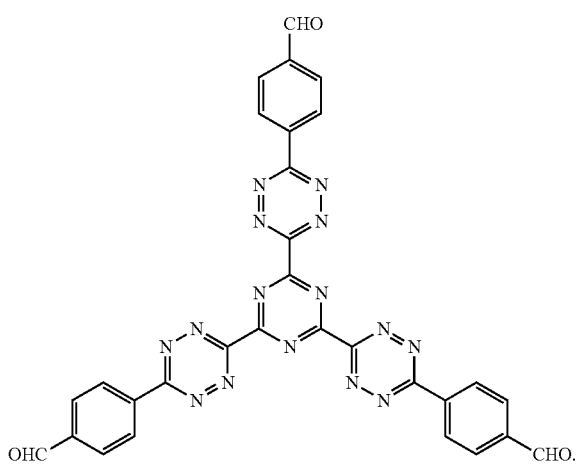

(II-2-4)

The compound (II-3) providing the first ligand can have, but is not limited to, a structure represented by one of Formula (II-3-1) to Formula (II-3-2):

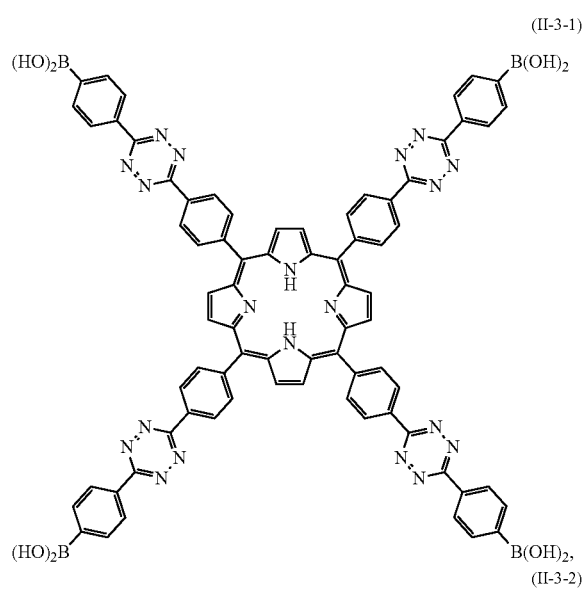

(II-3-1)

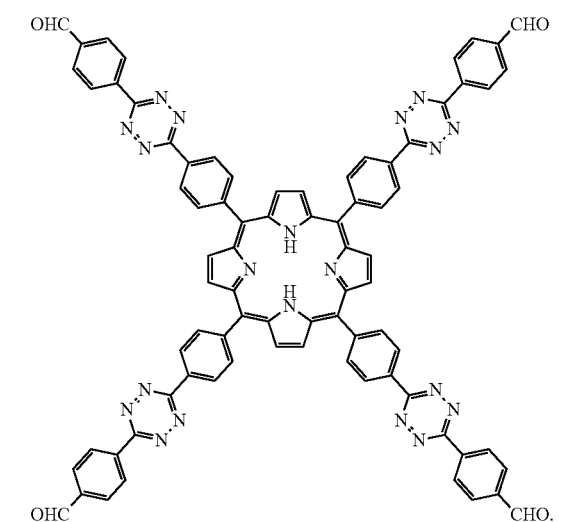

(II-3-2)

When the porous organic framework is the covalent organic framework, the porous organic framework can only include the first ligands. In this case, each compound providing each first ligand has a reactive functional group which is self-reactive, so that the plurality of compounds providing the first ligands can react with each other. As a result, the first ligands are covalently connected with each other so as to assemble the covalent organic framework.

When the porous organic framework is the covalent organic framework, the porous organic framework can further include a plurality of second ligands, and one of the second ligands is covalently connected with one of the first ligands. For example, the compounds providing the first ligands and the compounds providing the second ligands can undergo a condensation polymerization reaction, so that the first ligands can be covalently connected with the second ligands. The second ligands can be provided by, but not limited to, a compound including a plurality of hydroxyl groups, a plurality of amino groups or a plurality of aldehyde groups. For example, when the compound providing the first ligand includes a reactive functional group of —B(OH)$_2$, the compound providing the second ligand can include a reactive functional group of —OH; when the compound providing the first ligand includes a reactive functional group of —OH, the compound providing the second ligand can include a reactive functional group of —B(OH)$_2$; when the compound providing the first ligand includes a reactive functional group of —NH$_2$, the compound providing the second ligand can include a reactive functional group of —CHO; when the compound providing the first ligand includes a reactive functional group of —CHO, the compound providing the second ligand can include a reactive functional group of —NH$_2$. In other words, the kinds and the number of the reactive functional group of the compound providing the second ligand can be selected according to the kinds and the number of the reactive functional group of the compound providing the first ligand, so that the compound providing the first ligand and the compound providing the second ligand can undergo a reaction (such as a condensation reaction) so as to assemble the covalent organic framework.

The compound providing the second ligand can have a structure represented by one of Formula (III-1-1) to Formula (III-1-7), Formula (III-2-1) and Formula (III-2-2):

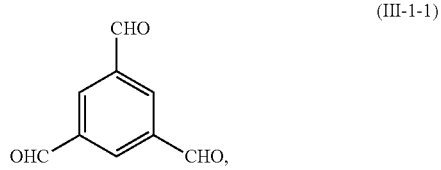

(III-1-1)

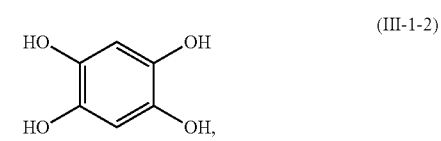

(III-1-2)

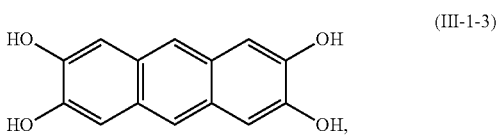

(III-1-3)

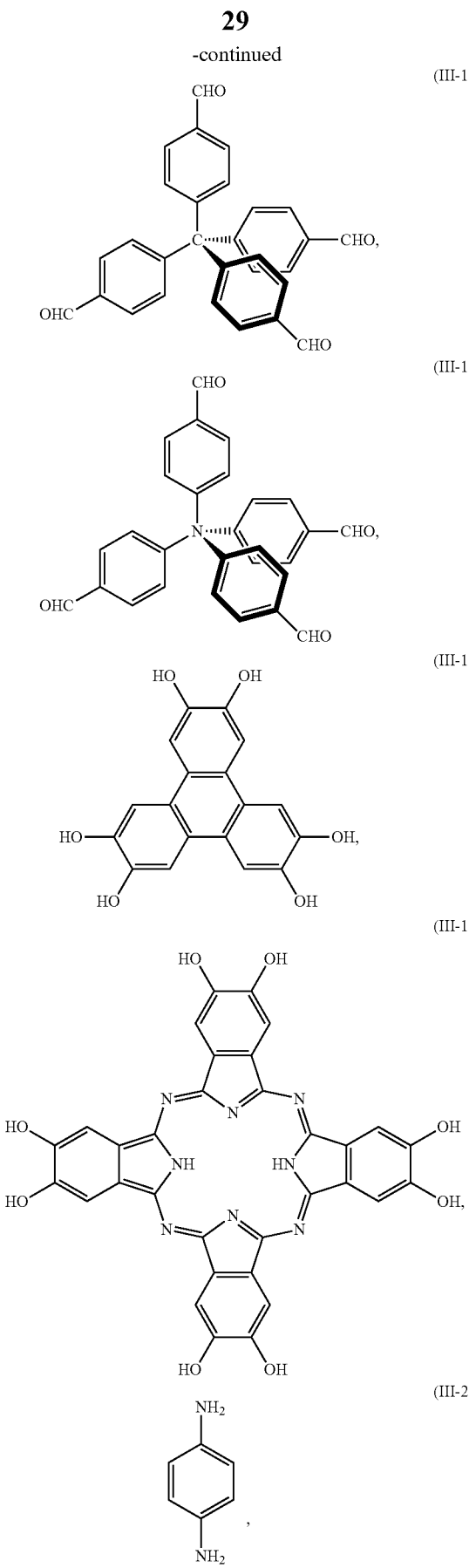

Table 1 shows covalent organic frameworks COF1-COF33 and the start materials for assembling the same. The start materials refer to the compounds providing the first ligand and the compounds providing the second ligand which assemble each of the covalent organic frameworks COF1-COF33. For example, COF1 is self-assembled by the compounds providing the first ligand (II-1-1). COF2 is assembled by the compounds providing the first ligand (II-1-1) and the compounds providing the second ligand (III-1-6). COF6 is assembled by the compounds providing the first ligand (II-2-1), the compounds providing the first ligand (II-2-2) and the compounds providing the second ligand (III-1-2). The start materials of other covalent organic frameworks are shown in Table 1 and are not listed here one by one. Moreover, no matter the covalent organic framework is assembled only by the compounds providing the first ligand or is assembled by both of the compounds providing the first ligand and the compounds providing the second ligand, one or more kinds of the compounds providing the first ligand can be used, and one or more kinds of the compounds providing the second ligand can be used. Moreover, the compounds providing the first ligand, the compounds providing the second ligand and the covalent organic frameworks COF1-COF33 recited in the present disclosure are only exemplary, and the present disclosure are not limited thereto. The compounds providing the first ligand and the compounds providing the second ligand can be selected according to practical needs so as to assemble the covalent organic frameworks with different properties (such as different pore sizes and crystal structures).

TABLE 1

| Covalent organic framework | Compound providing the first ligand | Compound providing the second ligand |
|---|---|---|
| COF1 | (II-1-1) | |
| COF2 | (II-1-1) | (III-1-6) |
| COF3 | (II-1-1) | (III-1-7) |
| COF4 | (II-2-1) | (III-1-2) |
| COF5 | (II-2-2) | (III-1-2) |
| COF6 | (II-2-1), (II-2-2) | (III-1-2) |
| COF7 | (II-2-1) | (III-1-6) |
| COF8 | (II-2-2) | (III-1-6) |
| COF9 | (II-2-1), (II-2-2) | (III-1-6) |
| COF10 | (II-2-1) | (III-1-7) |
| COF11 | (II-2-2) | (III-1-7) |
| COF12 | (II-2-1), (II-2-2) | (III-1-7) |
| COF13 | (II-3-1) | (III-1-2) |

TABLE 1-continued

| Covalent organic framework | Compound providing the first ligand | Compound providing the second ligand |
|---|---|---|
| COF14 | (II-3-1) | (III-1-3) |
| COF15 | (II-1-2) | (III-1-1) |
| COF16 | (II-2-3) | (III-2-1) |
| COF17 | (II-2-4) | (III-2-1) |
| COF18 | (II-2-3), (II-2-4) | (III-2-1) |
| COF19 | (II-2-3) | (III-2-2) |
| COF20 | (II-2-4) | (III-2-2) |
| COF21 | (II-2-3), (II-2-4) | (III-2-2) |
| COF22 | (II-2-3), (II-1-2) | |
| COF23 | (II-2-4), (II-1-2) | |
| COF24 | (II-2-3), (II-2-4), (II-1-2) | |
| COF25 | (II-2-3), (II-1-2) | (III-2-2) |
| COF26 | (II-2-4), (II-1-2) | (III-2-2) |
| COF27 | (II-2-3), (II-2-4), (II-1-2) | (III-2-2) |
| COF28 | (II-3-2) | (III-2-1) |
| COF29 | (II-3-2) | (III-2-2) |
| COF30 | (II-3-2), (II-1-2) | |
| COF31 | (II-3-2), (II-1-2) | (III-2-2) |
| COF32 | (II-1-2) | (III-1-4) |
| COF33 | (II-1-2) | (III-1-5) |

The aforementioned reactive functional groups can refer to the groups that allow the compounds providing the first ligand to conduct a self-reaction or refer to the groups that allow the compounds providing the first ligand and the compounds providing the second ligand to react with each other.

According to present disclosure, the first ligand is an organic ligand that includes at least one tetrazine group, and the second ligand is an organic ligand that has no tetrazine group.

According to one example of the present disclosure, the porous organic framework is formed by heating a mixture of 4,4'-(1,2,4,5-tetrazine-3,6-diyl)dibenzoic acid, aluminum chloride and N,N-diethylformamide.

The precursor of the porous organic framework can be reactants for manufacturing the porous organic framework. For example, when the porous organic framework is a metal organic framework, the precursor of the porous organic framework can be the compounds providing the first ligand and the compounds providing the metal source of the metal clusters. In other words, when the connecting step is conducted, the assembled porous organic framework can be provided first, and then, the tetrazine group of the porous organic framework and the functionalized melamine sponge react with each other so that the porous organic framework and the functionalized melamine sponge are connected to obtain a porous composite structure. Alternatively, when the connecting step is conducted, the compound providing the first ligand in the precursor of the porous organic framework can be provided to react with the functionalized melamine sponge via the tetrazine groups so that the compounds providing the first ligand can be firstly connected with the functionalized melamine sponge, and then, the compound providing the first ligand which is connected with the functionalized melamine sponge is coordinated with other components in the precursor of the porous organic framework to obtain a porous composite structure.

The order of Step 110 and Step 120 can be changed; alternatively, Step 110 and Step 120 can be conducted simultaneously.

In Step 130, the connecting step can be conducted at a temperature ranging from 30° C. to 150° C. for 2 hours to 12 hours. However, the present disclosure is not limited thereto, that is, the reaction temperature and the reaction time can be adjusted according to the kinds of the functionalized melamine sponge and the kinds of the porous organic framework.

Moreover, a solvent can be further added in Step 130. In other words, the functionalized melamine sponge and the porous organic framework are mixed with the solvent. The solvent of the mixed solution is for enhancing the solubility and chemical reactivity of organic groups. Therefore, a substance which can achieve the aforementioned functions can be the solvent of the mixed solution in Step 130. The solvent of the mixed solution can be, but is not limited to, N,N-dimethylformamide (DMF), N,N-diethylformamide (DEF), methanol, ethanol, ethyl ether, dichloromethane, tetrahydrofuran (THF), toluene, pyridine or benzene. The aforementioned solvent can be used alone or simultaneously with any ratio when no chemical reaction generated therebetween after mixing.

Furthermore, in Step 130, the dose relationship between the functionalized melamine sponge and the tetrazine groups is a size of 2 cm×4 cm×4 cm functionalized melamine sponge pairing to 5 mg of the tetrazine groups (the quantity of the first ligand can be estimated according to the weight of the tetrazine groups), wherein the functionalized melamine sponge can be the product manufactured by BASF, Germany. However, the present disclosure is not limited thereto, in the dose relationship of the functionalized melamine sponge and the tetrazine groups, the quantity of the tetrazine groups is excess to be able to conduct following modifying step.

In Step 140, the modifying step is conducted at a temperature ranging from 30° C. to 50° C. for 2 hours to 24 hours. However, the present disclosure is not limited thereto, the reaction temperature and the reaction time can be adjusted according to the kinds of the porous composite structure and the kinds of the modifying group donor The modifying group donor can have a structure represented by Formula (IV-1), Formula (IV-2) or Formula (IV-3):

(IV-1)

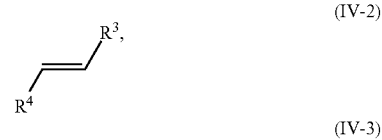

(IV-2)

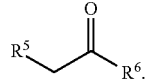

(IV-3)

The reaction equations of the modifying group donor (IV-1), the modifying group donor (IV-2), the modifying group donor (IV-3) and the tetrazine group of the porous organic framework source are shown in Table 2. Because the porous organic framework source reacts with the modifying group donor (IV-1), the modifying group donor (IV-2) or the modifying group donor (IV-3) via the tetrazine group, other portion of the porous organic framework source is omitted.

TABLE 2

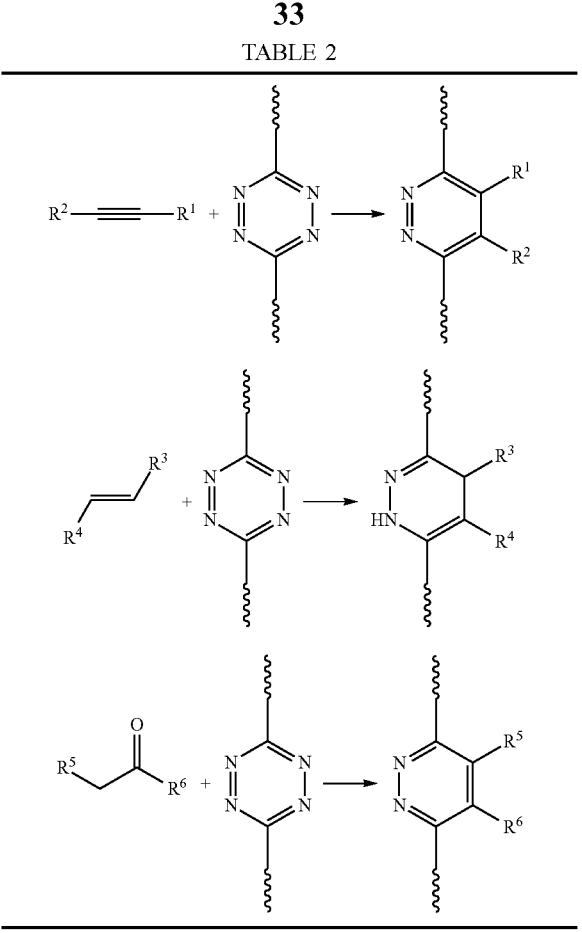

Each of $R^1$, $R^2$, $R^3$, $R^4$, $R^5$ and $R^6$ can independently represent H or a $C_1$-$C_{40}$ monovalent organic group. Alternatively, each of $R^1$, $R^2$, $R^3$, $R^4$, $R^5$ and $R^6$ can independently represent H, a $C_1$-$C_{40}$ alkyl group or a $C_6$-$C_{40}$ phenyl group. At least one H of the $C_1$-$C_{40}$ alkyl group can be substituted by $NH_2$, F, Cl, Br or I. At least one methylene group ($CH_2$) of the $C_1$-$C_{40}$ alkyl group can be substituted by NH or a carbonyl group. At least one H of the $C_6$-$C_{40}$ phenyl group can be substituted by $NH_2$, F, Cl, Br or I. At least one $CH_2$ of the $C_6$-$C_{40}$ phenyl group can be substituted by NH or a carbonyl group. The CH of a benzene ring of the $C_6$-$C_{40}$ phenyl group can be substituted by N.

The modifying group donor (IV-1) can have a structure represented by one of Formula (IV-1-1) to Formula (IV-1-10):

(IV-1-1)

(IV-1-2)

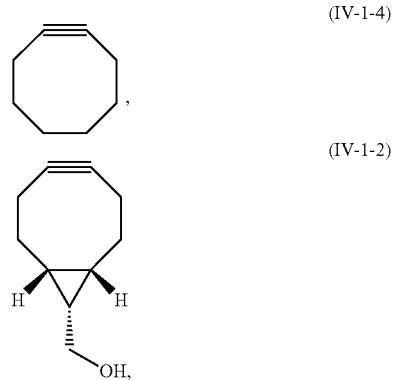

(IV-1-3)

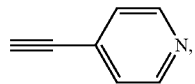

(IV-1-4)

(IV-1-5)

(IV-1-6)

(IV-1-7)

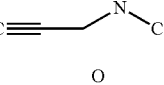

(IV-1-8)

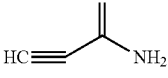

(IV-1-9)

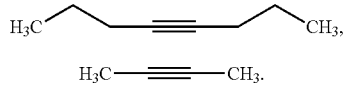

(IV-1-10)

$H_3C$———≡———$CH_3$.

The modifying group donor (IV-2) can be, but is not limited to, 1-octadecene or 2-propen-1-amine.

The modifying group donor (IV-3) can be, but is not limited to, acetone.

$R^1$ and $R^2$ represent H or a $C_6$-$C_{22}$ alkyl group, and at least one of the $R^1$ and $R^2$ is a $C_6$-$C_{22}$ alkyl group, at least one H of the aforementioned $C_6$-$C_{22}$ alkyl group can be substituted by F. $R^3$ and $R^4$ represent H or a $C_6$-$C_{22}$ alkyl group, and at least one of the $R^3$ and $R^4$ is a $C_6$-$C_{22}$ alkyl group, at least one H of the aforementioned $C_6$-$C_{22}$ alkyl group can be substituted by F. $R^5$ and $R^6$ represent H or a $C_6$-$C_{22}$ alkyl group, and at least one of the $R^5$ and $R^6$ is a $C_6$-$C_{22}$ alkyl group, at least one H of the aforementioned $C_6$-$C_{22}$ alkyl group can be substituted by F.

According to one example of the present disclosure, the modifying group donor is 1-octadecene.

Furthermore, a solvent can be further added in Step 140. In other words, the porous composite structure, the modifying group donor, and the solvent are mixed. The solvent of the mixed solution is for enhancing the solubility and chemical reactivity of organic groups. Therefore, a substance which can achieve the aforementioned functions can be the solvent of the mixed solution in Step 140. The solvent of the mixed solution can be, but is not limited to, N,N-dimethylformamide (DMF), N,N-diethylformamide (DEF), methanol, ethanol, ethyl ether, dichloromethane, tetrahydrofuran (THF), toluene, pyridine or benzene. The aforementioned solvent can be used alone or simultaneously with any ratio when no chemical reaction generated therebetween after mixing.

Modified Porous Composite Structure

According to the present disclosure, a modified porous composite structure is provided. The modified porous composite structure is manufactured by the aforementioned method for manufacturing the modified porous composite structure. The modified porous composite structure according to the present disclosure is hydrophobic which is favorable for absorbing organic liquid so as to be applicable on removing the organic liquid in water source or marine oil pollution.

Method for Absorbing Organic Liquid

FIG. 2 is a flow diagram showing a method for absorbing organic liquid 200 according to another embodiment of the present disclosure. In FIG. 2, the method for absorbing organic liquid 200 includes Step 210.

In Step 210, the modified porous composite structure according to the present disclosure is contacted to an organic liquid, wherein the modified porous composite structure absorbs the organic liquid. The organic liquid can be, but not limited to, organic contaminants in polluted water source or marine oil pollution. Thereby, according to the method for absorbing organic liquid of the present disclosure, it can be applied on removing the organic liquid in the water source or marine oil pollution.

SYNTHESIS OF EXAMPLES

Example 1: AlTz53-Sponge-C18

First, a functionalized melamine sponge is provided. The method for manufacturing the functionalized melamine sponge is as follows. The commercial melamine sponge (manufactured by BASF, Germany), 25 ml DMF, and excess potassium tert-butoxide are put into a single neck, round-bottom flask and is heated at 180° C. for 2 hours; then, 2.5 ml allyl chloride is further added and heated at 180° C. for 12 hours. When the reaction ends, the functionalized melamine sponge is obtained. The functionalized melamine sponge is washed with DMF for several times and is kept storage by immersing in DMF till conducting the following experiments. Next, a porous organic framework AlTz53 is provided and the method for manufacturing the porous organic framework AlTz53 is as follows. A mixture of 0.235 mmole $AlCl_3$, 0.18 mmole 1,2,4,5-tetrazine-3,6-dicarboxylic acid ($H_2TZDB$) and 5.0 ml DEF are mixed and heated at 120° C. for 1 day. After the reaction ends, the porous organic framework AlTz53 is obtained. The porous organic framework AlTz53 is washed with DMF for several times and is kept storage by immersing in DMF till conducting the following experiments. Next, a connecting step is conducted. Before the connecting step is conducted, the DMF of the functionalized melamine sponge is replaced to ethyl ether, and the functionalized melamine sponge is completely immersed in ethyl ether (it is called ether solution of functionalized melamine sponge as follows, and the purpose of the solution replacement is that the connecting step will be conducted in ethyl ether). Then, 10 mg porous organic framework AlTz53 is added into the aforementioned ether solution of functionalized melamine sponge and reacted at 30° C. for 2 hours so as to form a porous composite structure. Next, a modifying step is conducted. The synthesized porous composite structure is taken out from the original solution to put into a fresh ethyl ether solvent, and 2 ml 1-octadecene is added and reacted at 30° C. for 2 hours so as to obtain a modified porous composite structure. After that, the product is washed with ethyl ether solvent for several times and dried in an oven at 75° C. for 1 hour so as to obtain a dried modified porous composite structure.

The reaction equation of AlTz53-sponge-C18 of the synthesized example 1 is shown in Table 3. In the column shown "providing a functionalized melamine sponge" of Table 3, the melamine sponge uses the structure showed in parentheses as the repeating monomer, and n represents the number of the repeating monomer. The number of the repeating monomer is determined by the product characteristics, so it is not defined herein. The repeating monomers are connected with each other via NH—$CH_2$— connecting to benzene. In the column shown "conducting a connecting step" of Table 3, because the porous organic framework AlTz53 reacts with the functionalized melamine sponge via the tetrazine group, only partial structure including one of the first ligands of the porous organic framework AlTz53 is shown. In the column shown "conducting a modifying step" of Table 3, because the porous composite structure reacts with the 1-octadecene via the tetrazine group, only partial structure including two of the first ligands of the porous composite structure (wherein one of the first ligands has reacted with the functionalized melamine sponge) is shown. As shown in Table 3, after the reaction of the tetrazine group and the 1-octadecene, a cetyl group is modified on the porous composite structure. In other words, the modifying group of Example 1 is the cetyl group.

TABLE 3

Providing a functional melamine sponge

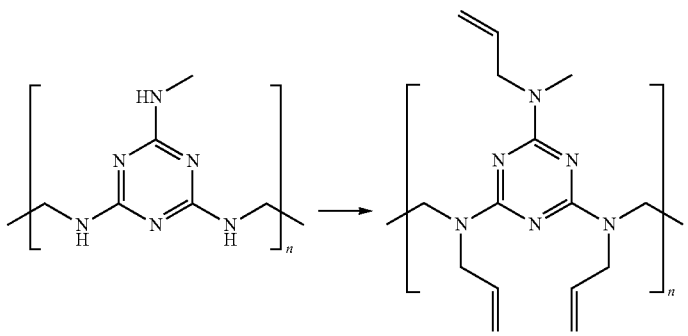

TABLE 3-continued
Conducting a connecting step
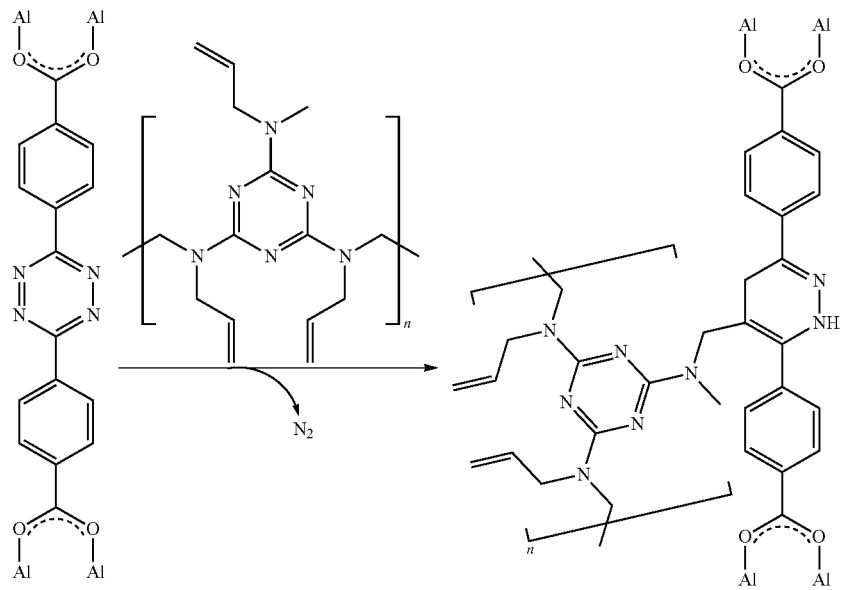
Conducting a modifying step
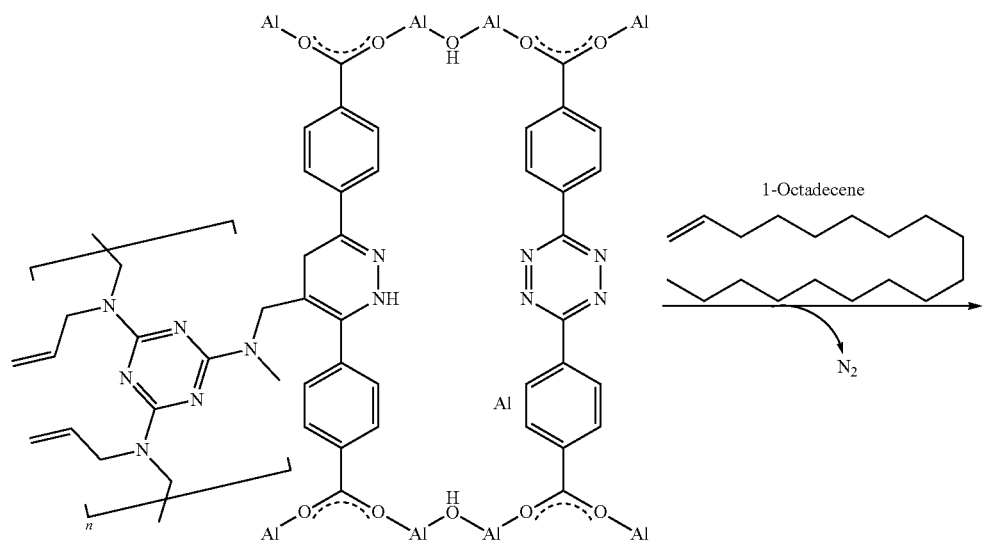

TABLE 3-continued

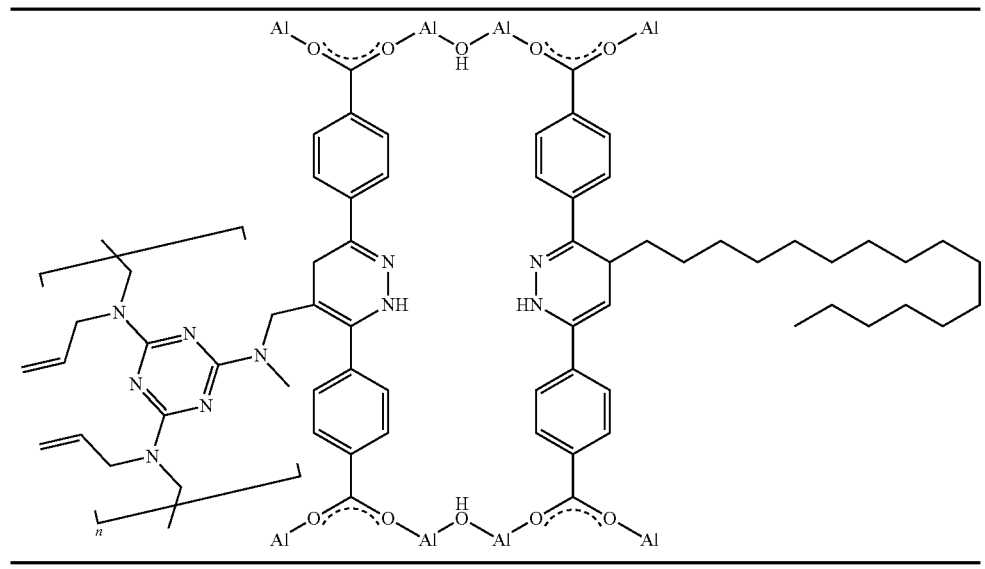

Example 2: AlTz68-Sponge-C18

First, a functionalized melamine sponge is provided. The method for manufacturing a functionalized melamine sponge is the same as Example 1, and will not be described herein again. Next, a porous organic framework AlTz68 is provided, and the method for manufacturing the porous organic framework AlTz68 is as follows. The porous organic framework AlTz53 (manufacturing method thereof shown in Example 1) with an amount of 10 mg is immersed in 3.0 ml ethyl ether for a solvent replacement, which is repeated three times. Then the porous organic framework AlTz53 is immersed in ethyl ether, a height of the ethyl ether is 0.5 cm higher than that of the porous organic framework AlTz53. The mixture of the porous organic framework AlTz53 and ethyl ether is put in an oven and is heated at 75° C. for 1 hour, so that the porous organic framework AlTz68 is obtained. After that, a connecting step and a modifying step are conducted, the porous organic framework AlTz53 in Example 1 is replaced with the porous organic framework AlTz68, and the other steps are the same, so that a dried modified porous composite structure can be obtained. The reaction equation of AlTz68-sponge-C18 of the synthesized Example 2 is the same as Example 1; please refer to aforementioned Table 3. The difference between Example 2 and Example 1 is the lattice structures. The lattice structure of the porous organic framework AlTz53 is sra framework, and the lattice structure of the porous organic framework AlTz68 belongs to kge framework; however, the composition of the porous organic framework AlTz53 and the porous organic framework AlTz68 is the same.

Example 3: AlTz68-Sponge-C18

First, a functionalized melamine sponge is provided. The method for manufacturing a functionalized melamine sponge is the same as Example 1, and will not be described herein again. Next, a precursor of the porous organic framework $H_2TZDB$ solution is provided, which is formed by dissolving 3 mg $H_2TZDB$ in 5 ml DEF. Then a connecting step is conducted. The functionalized melamine sponge is immersed in $H_2TZDB$ solution at 120° C. for 1 hour, and 150 mg $AlCl_3$ is further added to react at 120° C. for 1 hour so as to obtain a porous composite structure combined by the porous organic framework AlTz53 and the functionalized melamine sponge. The porous organic framework AlTz53 is immersed in 3.0 ml ethyl ether for a solvent replacement, which is repeated three times. Then the porous organic framework AlTz53 is immersed in ethyl ether, a height of the ethyl ether is 0.5 cm higher than that of the porous organic framework AlTz53. The mixture of the porous organic framework AlTz53 and ethyl ether is put in an oven and is heated at 75° C. for 1 hour, so that the porous composite structure connected by the porous organic framework AlTz68 and the functionalized melamine sponge is obtained. After that, a modifying step is conducted, the detail is the same as Example 1, and a dried modified porous composite structure can be obtained. The deference between the synthesized Example 3 and Example 2 is described as follows. When the connecting step is conducted in Example 2, an assembled porous organic framework AlTz68 is provided to react with the functionalized melamine sponge so as to obtain a porous composite structure. In Example 3, a compound providing the first ligand in a precursor of the porous organic framework ($H_2TZDB$ solution) is provided first, and the compound providing the first ligand is connected with the functionalized melamine sponge; and then, it is assembled with the others substance ($AlCl_3$) of the precursor of the porous organic framework to obtain a porous composite structure.

The reaction equation of AlTz68-sponge-C18 of the synthesized Example 3 is shown in Table 4. In the column shown "providing a functionalized melamine sponge" of Table 4, the melamine sponge uses the structure showed in parentheses as the repeating monomer, and n represents the number of the repeating monomer. The number of the repeating monomer is determined by the product characteristics, so it is not defined herein. The repeating monomers are connected with each other via NH—$CH_2$— connecting to benzene. In the column shown "conducting a connecting step" of Table 4, because the porous organic framework AlTz53 reacts with the functionalized melamine sponge via the tetrazine group, only partial structure including one of the first ligands of the porous organic framework AlTz53 is shown. In the column shown "conducting a modifying step" of Table 4, because the porous composite structure reacts with the 1-octadecene via the tetrazine group, only partial structure including two of the first ligands of the porous composite structure (wherein one of the first ligands has reacted with the functionalized melamine sponge) is shown. As shown in Table 4, after the reaction of the tetrazine group and the 1-octadecene, a cetyl group is modified on the porous composite structure. In other words, the modifying group of Example 3 is the cetyl group.

TABLE 4

Providing a functionalized melamine sponge

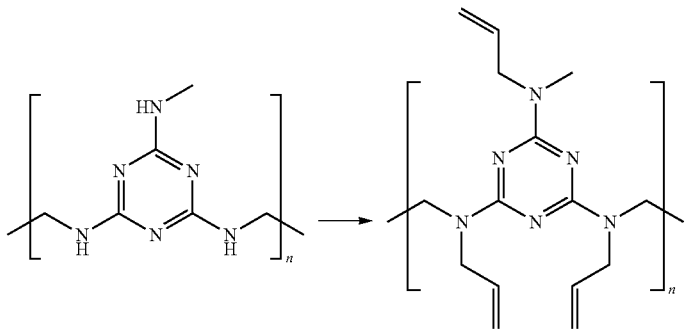

In conducting a connecting step, the functionalized melamine sponge is connected with the first ligand

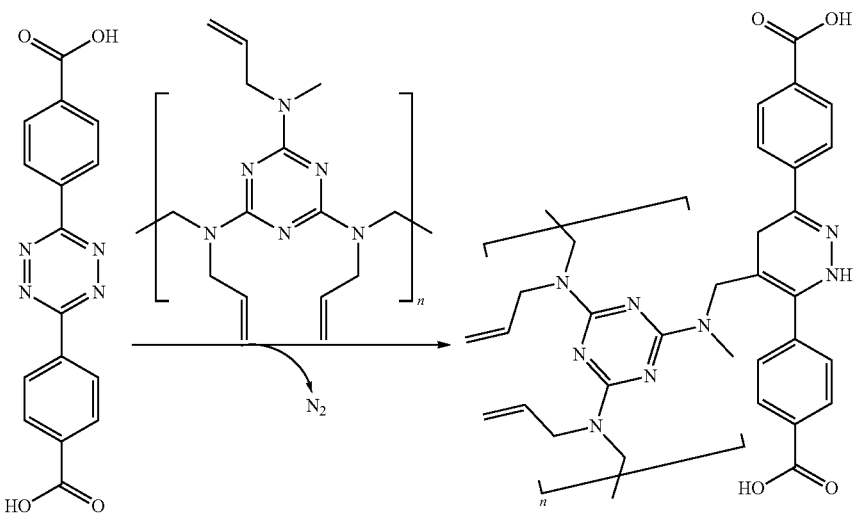

TABLE 4-continued
In conducting a connecting step, the first ligand is connected with the functionalized melamine sponge first and then is assembled with AlCl₃
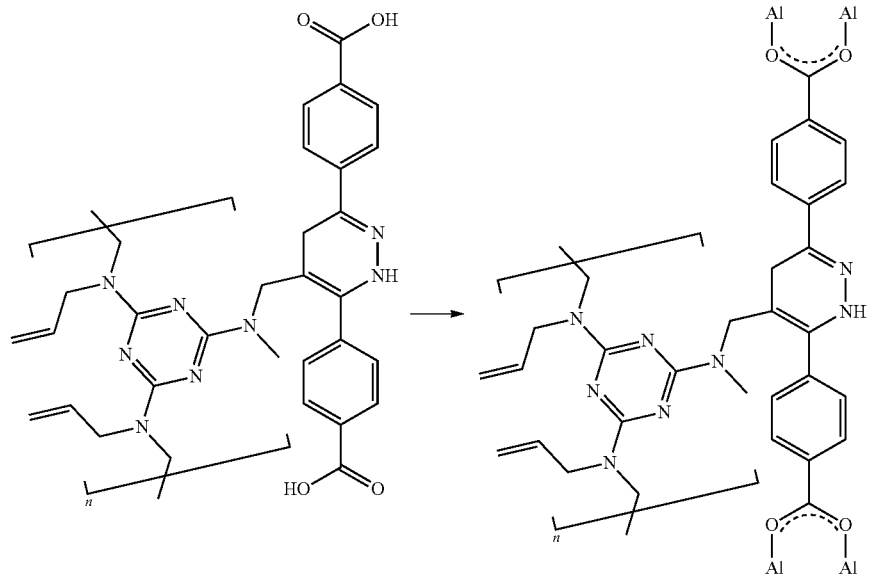
Conducting a modifying step
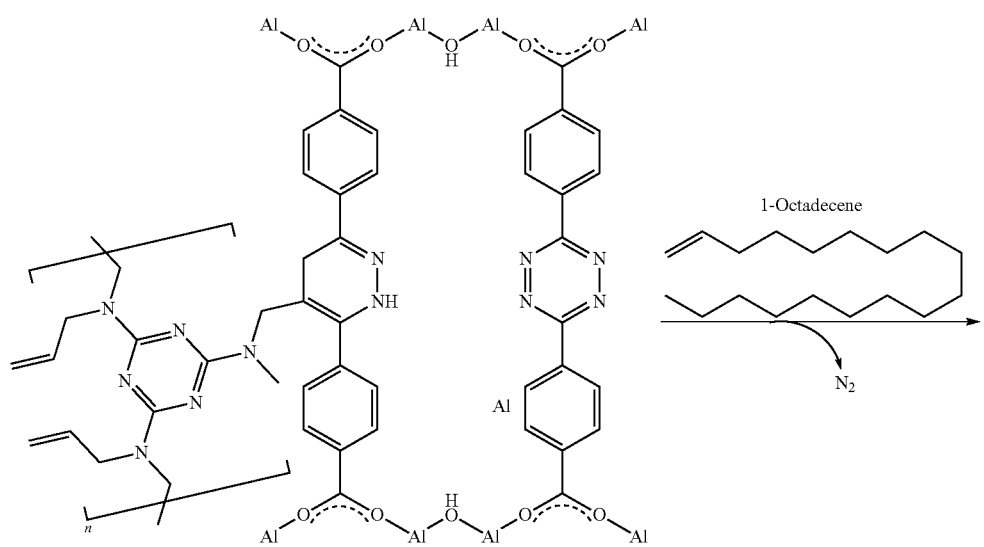

TABLE 4-continued

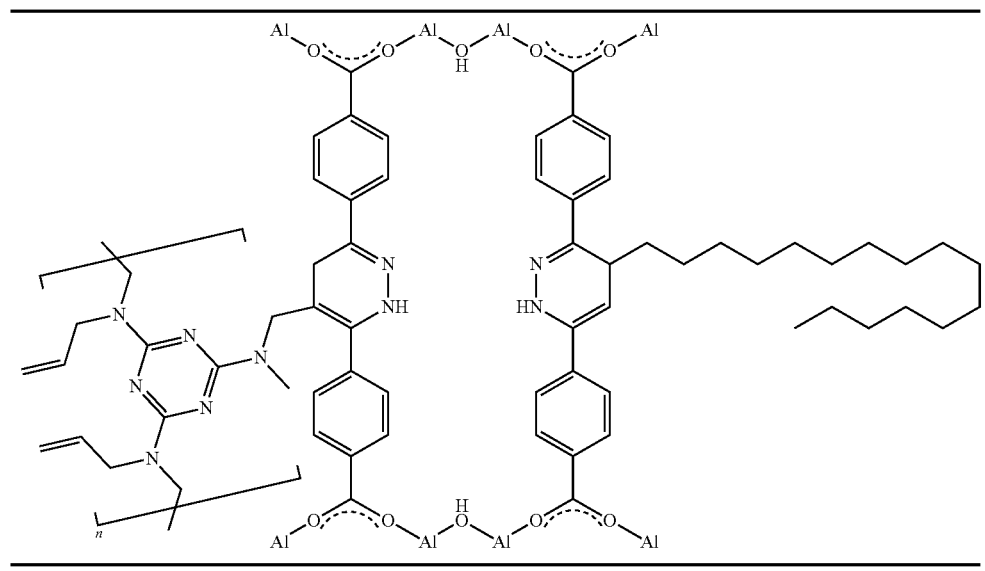

Example 4: ZrTz68-Sponge-C18

First, a functionalized melamine sponge is provided. The method for manufacturing a functionalized melamine sponge is the same as Example 1; it is not described here again. Next, a porous organic framework ZrTz68 is provided, and the method for manufacturing porous organic framework ZrTz68 is as follow. A mixture of 0.045 mmole $ZrCl_4$, 0.045 mmole $H_2TZDB$, 0.01 ml trifluoroacetic acid and 2.5 ml DMF is heated at 120° C. for 2 days. After the reaction ends, the solid product is washed with 2.0 ml DMF for 3 times then immersed in DMF for 2 days, and further immersed in $CHCl_3$ for another 2 days. Afterword, the mixture of the solid product and the $CHCl_3$ is heated at 90° C. for 12 hours so as to obtain the porous organic framework ZrTz68. The porous organic framework ZrTz68 is kept storage by immersing in DMF till conducting the following experiments. After that, a connecting step and a modifying step are conducted, the porous organic framework AlTz53 in Example 1 is replaced with the porous organic framework ZrTz68, and the other steps are the same, so that a dried modified porous composite structure can be obtained.

Example 5: ZrTz68-Sponge-C18

In the method for synthesizing the modified porous composite structure ZrTz68-sponge-C18 of Example 5, the reaction time in the modifying step of Example 4 is replaced 2 hours with 12 hours, and the others steps are the same so as to obtain a dried modified porous composite structure.

Properties Measurement of the Examples

Figure 3:
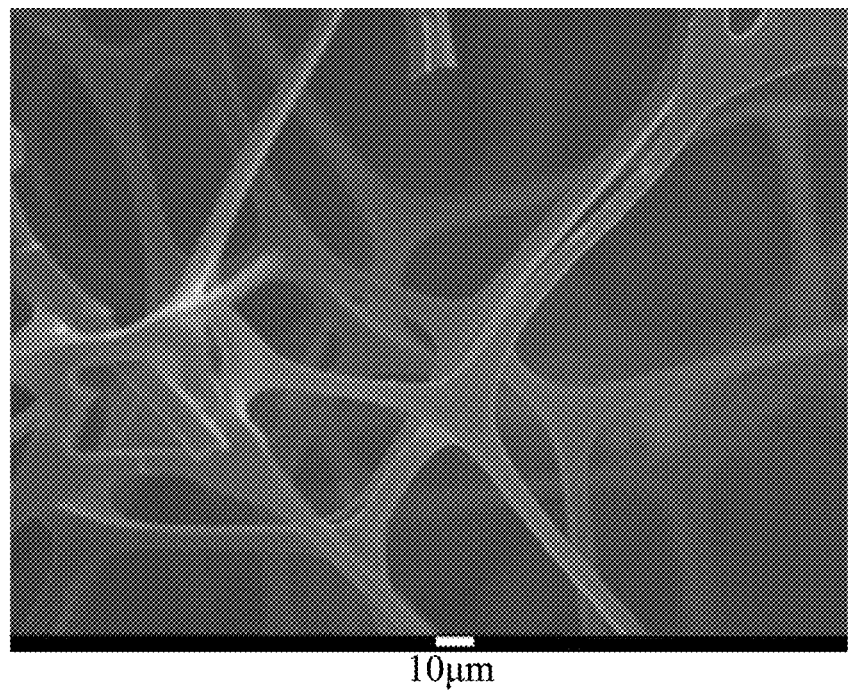
FIG. 3 is a scanning electron microscope (SEM) image of a melamine sponge.
Figure 4:
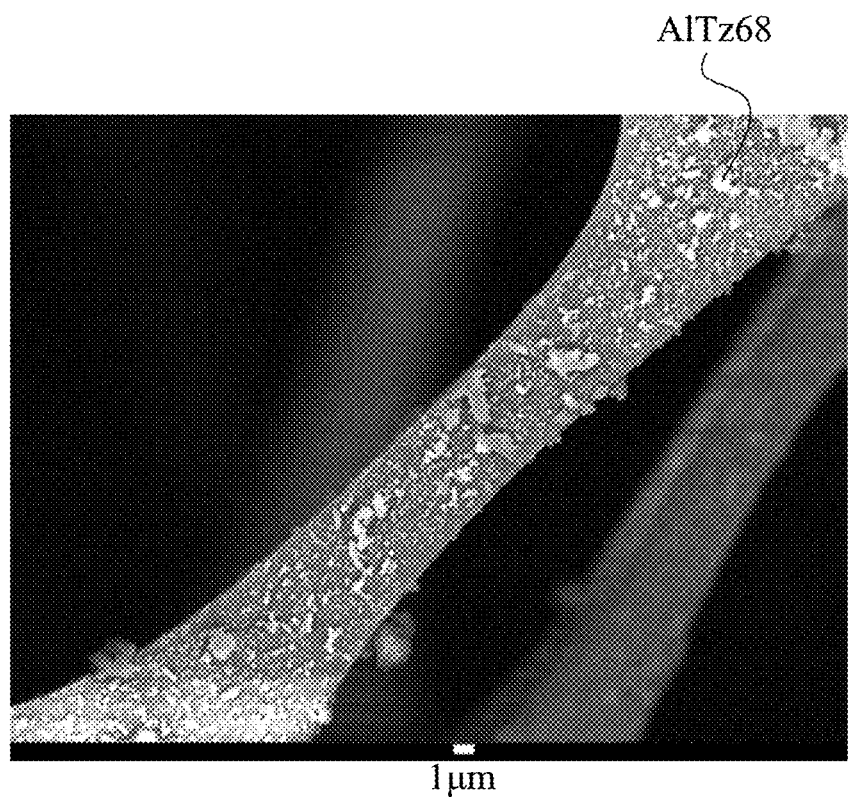
FIG. 4 is a SEM image showing a modified porous composite structure of Example 2.
Figure 5:
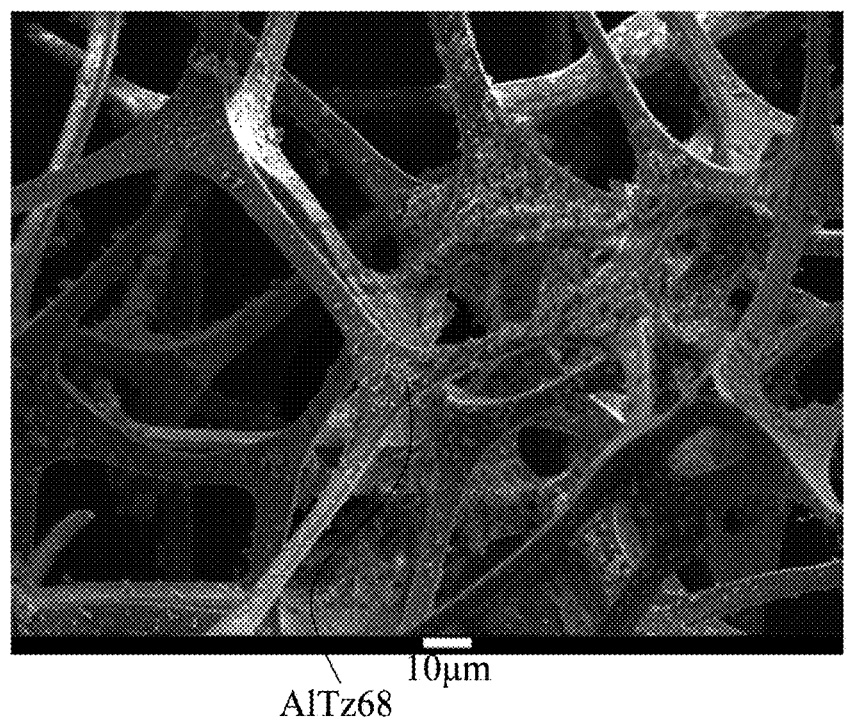
FIG. 5 is a SEM image showing a modified porous composite structure of Example 3.
Figure 6:
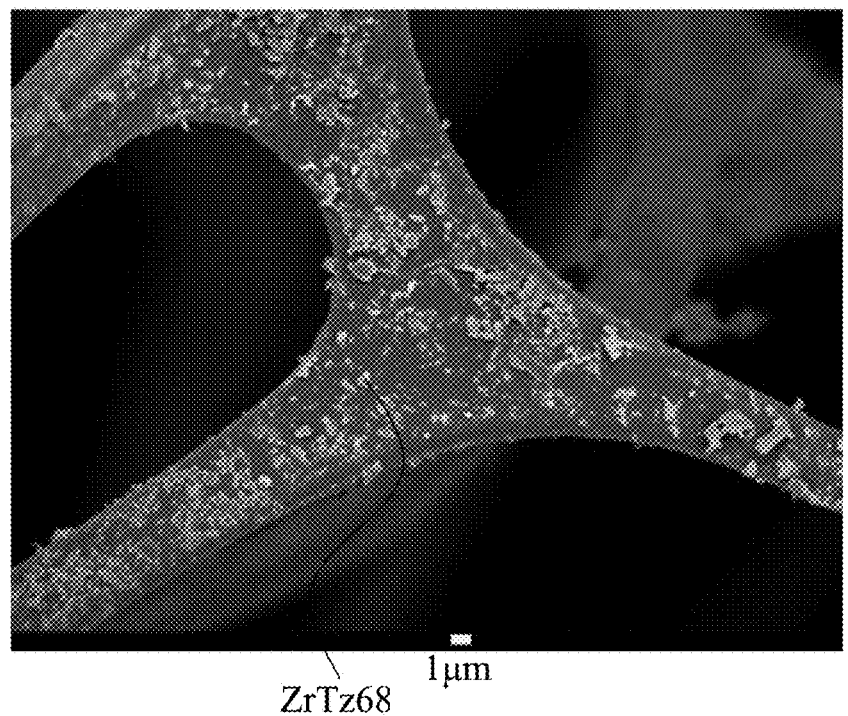
FIG. 6 is a SEM image showing a modified porous composite structure of Example 4.

1. The measuring method of scanning electron microscope (SEM) image: a little piece of the sample (melamine sponge and modified porous composite structure) is cut and adhered to a conductive carbon tape specific for SEM to put under vacuum for about 30 minutes. Then the vacuum sample is disposed in SEM (model: JSM-7600F, JEOL) to observe the micro structure of the sample. FIG. 3 is a scanning electron microscope (SEM) image of a melamine sponge; FIG. 4 is a SEM image showing a modified porous composite structure of Example 2; FIG. 5 is a SEM image showing a modified porous composite structure of Example 3; and FIG. 6 is a SEM image showing a modified porous composite structure of Example 4. In detail, the melamine sponge in FIG. 3 is a commercial melamine sponge and is without functionalization. As shown in FIG. 3, the melamine sponge has a network structure with porous, so it has the ability to absorb liquid and gas. In FIG. 4, the modified porous organic framework AlTz68 is observed on the framework of the functionalized melamine sponge, showing that the functionalized melamine sponge and the porous organic framework AlTz68 are successfully connected and then conducted modification in Example 2. The product of Example 2 is modified porous composite structure undoubtedly. In FIG. 5, the modified porous organic framework AlTz68 is observed on the functionalized melamine sponge, showing that the functionalized melamine sponge and the porous organic framework AlTz68 are successfully connected and then conducted modification in Example 3. The product of Example 3 is modified porous composite structure undoubtedly. In FIG. 6, the modified porous organic framework ZrTz68 is observed on the functionalized melamine sponge, showing that the functionalized melamine sponge and the porous organic framework ZrTz68 are successfully connected and then conducted modification in Example 4. The product of Example 4 is modified porous composite structure undoubtedly.

Figure 7:
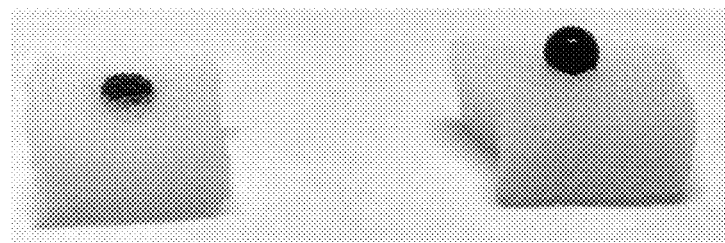
FIG. 7 is a hydrophilic/hydrophobic test result of a melamine sponge and Example 2.
Figure 8:
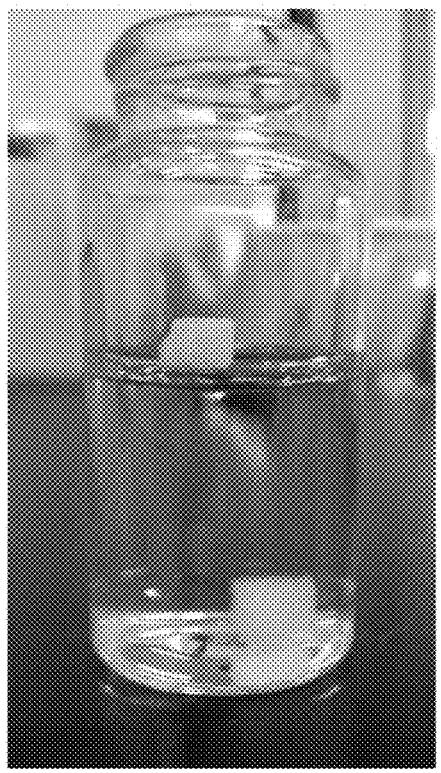
FIG. 8 is another hydrophilic/hydrophobic test result of a melamine sponge and Example 2.
Figure 9:
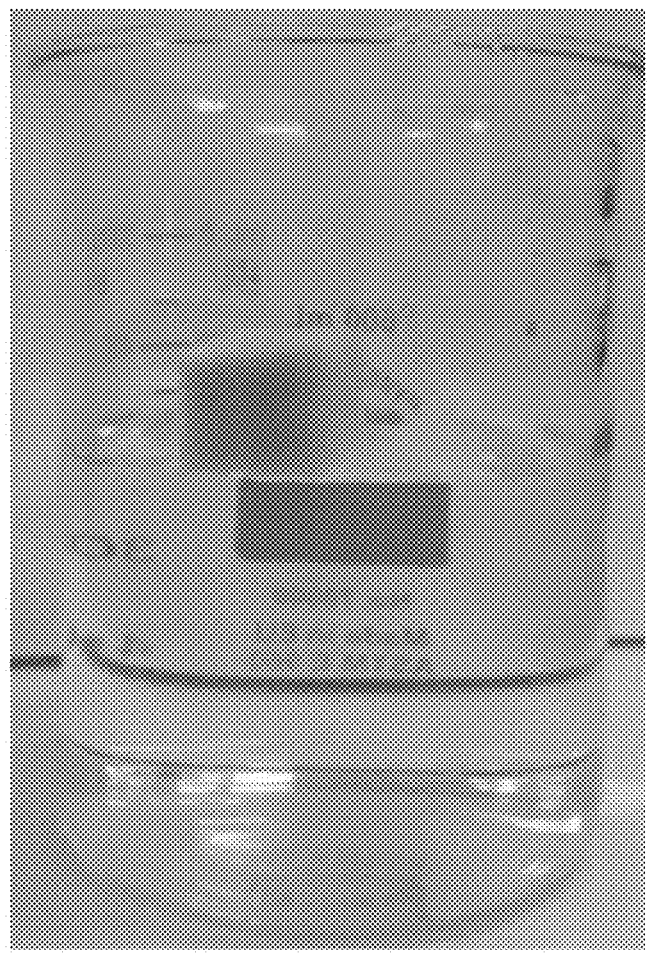
FIG. 9 is a hydrophilic/hydrophobic test result of Example 5.

2. Hydrophilic/Hydrophobic test: first, the sample (melamine sponge and modified porous composite structure) is cut into about 1 $cm^3$ cubes, and a drop of water including water-soluble dye is dropped on the surface of the sample. FIG. 7 is a hydrophilic/hydrophobic test result of a melamine sponge and Example 2. In detail, the melamine sponge in FIG. 7 is a commercial melamine sponge and is without functionalization. In FIG. 7, the water drop including water-soluble dye permeates into the melamine sponge, showing that the melamine sponge is hydrophilic; on the contrary, the water drop including water-soluble dye is kept in its shape and is not permeated into the modified porous composite structure of Example 2, showing that the modified porous composite structure of Example 2 is hydrophobic. Next, the sample (melamine sponge and modified porous composite structure) is cut into about 1 $cm^3$ cubes and is put into a bottle with water. FIG. 8 is another hydrophilic/hydrophobic test result of a melamine sponge and Example 2. In detail, the melamine sponge in FIG. 8 is a commercial melamine sponge and is without functionalization. In FIG. 8, because the melamine sponge is hydrophilic, the water goes into the holes of the network of the melamine sponge, making the melamine sponge sink to the bottom of the bottle. However, the modified porous composite structure of Example 2 is hydrophobic, so the water cannot permeate into the holes of the network of the modified porous composite structure, making the modified porous composite structure float on the water. FIG. 9 is a hydrophilic/hydrophobic test result of Example 5. In FIG. 9, the modified porous composite structure of Example 5 is hydrophobic, so the water cannot permeate into the holes of the network of the modified porous composite structure, making the modified porous composite structure float on the water. As shown in FIG. 7 and FIG. 9, the functionalized melamine sponge can be connected to the porous organic framework by functionalizing the melamine sponge in the present disclosure, further conducting modification by the modify group to change the surface property of the melamine sponge so as to convert the hydrophilicity of the melamine sponge to the hydrophobicity.

3. The absorbing weight test of the modified porous composite structure to the organic liquid: the modified porous composite structure of Examples is cut into several 1 cm³ cubes, respectively conducting the absorbing weight test of different organic liquid. Calculation formula is $M_{abs}=(M-M_0)/M_0$, wherein M represents the weight of the modified porous composite structure after absorbing the organic liquid (including the weight of the modified porous composite structure and the weight of the absorbed organic liquid), $M_0$ presents the weight of the modified porous composite structure before absorbing the organic liquid, $M_{abs}$ represents the absorption folds; in detail, $M_{abs}$ represents the relationship between the weight of the organic liquid absorbed by the modified porous composite structure and the original weight of the modified porous composite structure.

Figure 11:
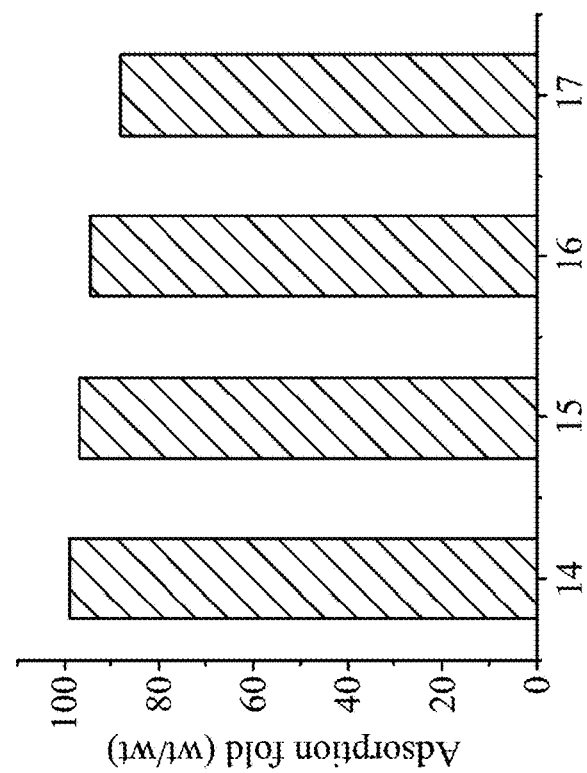
FIG. 11 is another absorbing weight test result of Example 1 to organic liquid.
Figure 10:
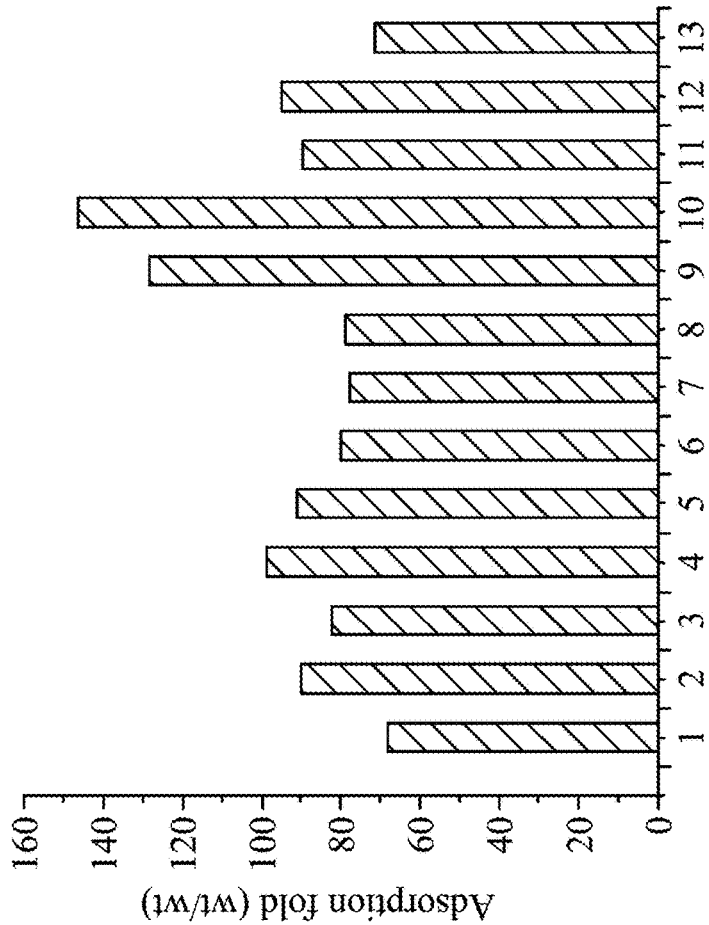
FIG. 10 is an absorbing weight test result of Example 1 to organic liquid.

FIG. 10 is an absorbing weight test result of Example 1 to organic liquid, focusing on the test of the substance that is often used for organic solvent in organic liquid. In FIG. 10, a vertical-coordinate represents the absorption folds, that is the $M_{abs}$ value calculated by the aforementioned calculation formula; a horizontal-coordinate 1-13 corresponds to different organic liquid, 1 represents n-heptane, 2 represents ethyl acetate (EA), 3 represents 1-octadecene, 4 represents silicon oil, 5 represents mesitylene, 6 represents acetone, 7 represents ethanol, 8 represents methanol, 9 represents dichloromethane, 10 represents chloroform, 11 represents toluene, 12 represents dimethylformamide, and 13 represents diethyl ether. As shown in FIG. 10, the least absorption fold is n-heptane and about 68.1 folds, that the modified porous composite structure can absorb n-heptane to 68.1 times its own original weight; the highest absorption fold is chloroform about 146.7 folds, that the modified porous composite structure can absorb chloroform to 146.7 times its own original weight. FIG. 11 is another absorbing weight test result of Example 1 to organic liquid, focusing on the test of the oil substance in organic liquid. In FIG. 11, a vertical-coordinate represents the absorption folds, that is the $M_{abs}$ value calculated by the aforementioned calculation formula; a horizontal-coordinate 14-17 corresponds to different oil substance, 14 represents silicone oil, 15 represents plant oil (soybean oil here), 16 represents engine oil, and 17 represents pump oil. As shown in FIG. 11, the absorption folds of the modified porous composite structure to the oil substance are ranged from 90 times to 100 times. Besides, Example 2 and Example 3 are respectively conducted the absorption weight test of organic liquid, the results are similar to that showing in FIG. 10 and FIG. 11, so there are not shown again.

Figure 12:
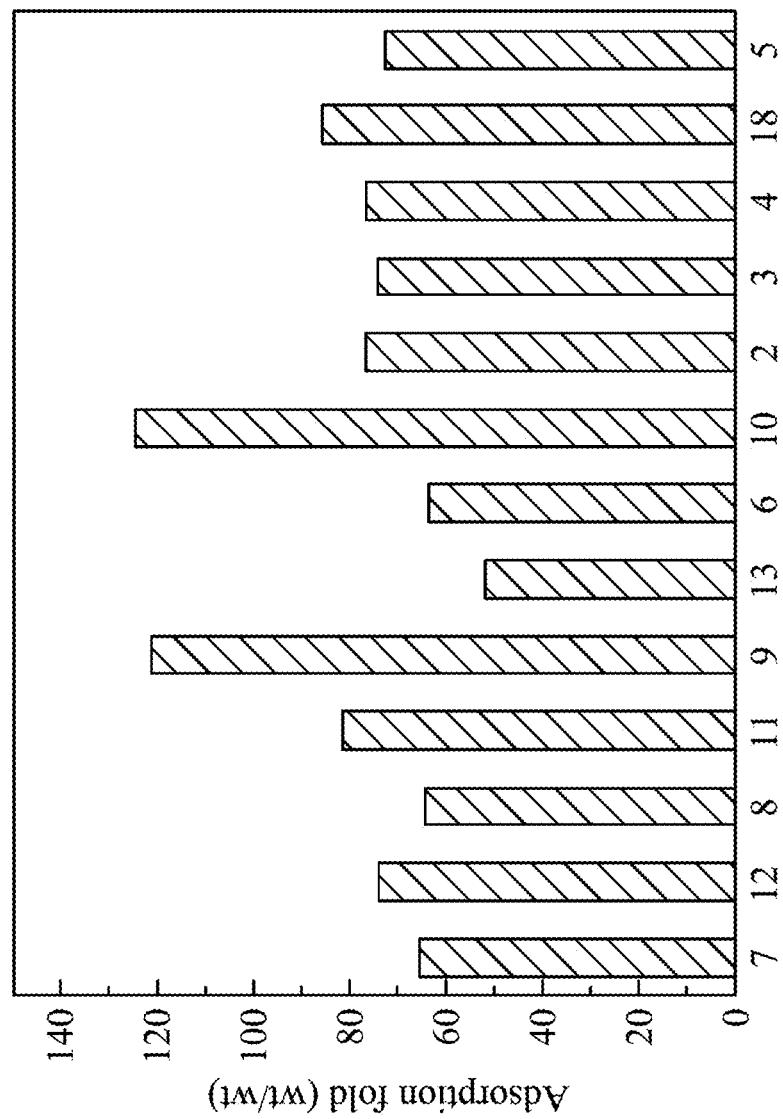
FIG. 12 is an absorbing weight test result of Example 5 to organic liquid.

FIG. 12 is an absorbing weight test result of Example 5 to organic liquid, focusing on the test of the substance that is often used for organic solvent in organic liquid. In FIG. 12, a vertical-coordinate represents the absorption folds, that is the $M_{abs}$ value calculated by the aforementioned calculation formula; a horizontal-coordinate 2-13, 18 corresponds to different organic liquid. 2-13 represent the organic liquid shown as FIG. 10 and are not described here again, and 18 represents benzene. As shown in FIG. 12, the least absorption fold is diethyl ether about 52 times, that the modified porous composite structure can absorb diethyl ether to 52 times its own original weight; the highest absorption fold is chloroform about 125 times, that the modified porous composite structure can absorb chloroform to 125 times its own original weight.

As shown in FIG. 10 and FIG. 12, the modified porous composite structure of the present disclosure has well ability to absorbing the organic liquid, which can be applied to remove the organic liquid in the water source or marine oil pollution.

Figure 13:
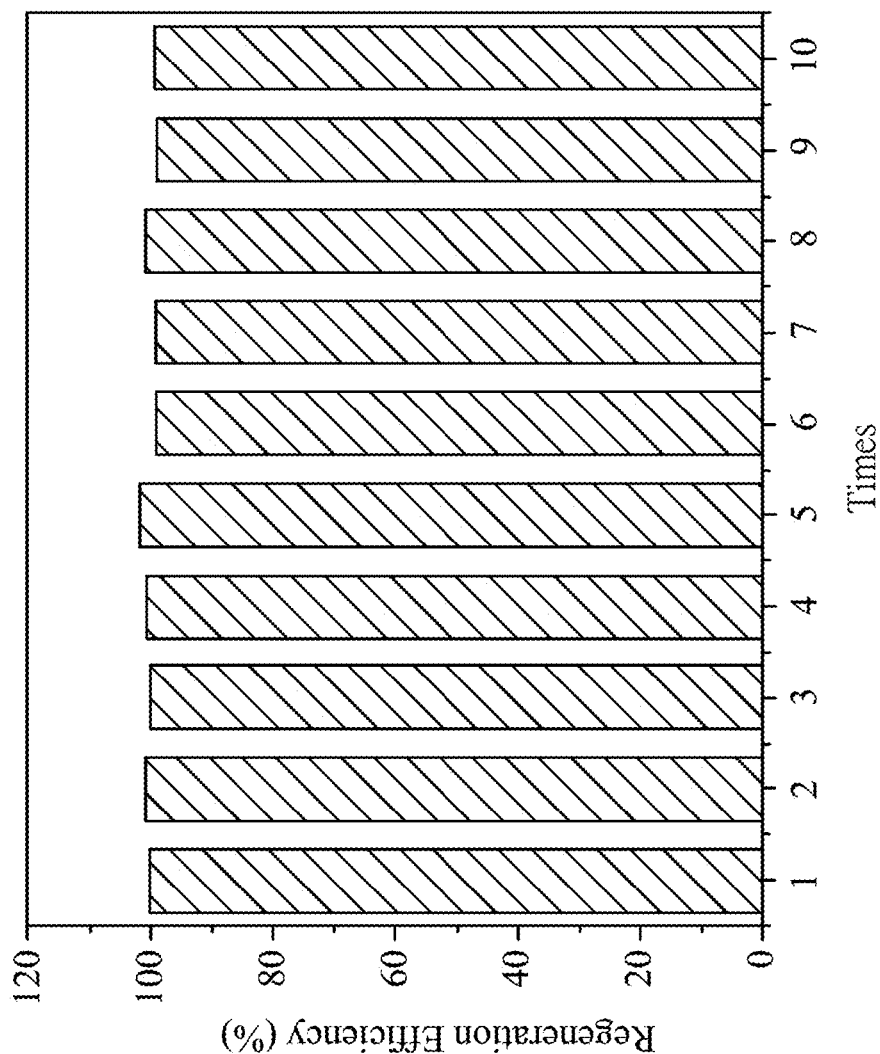
FIG. 13 is an absorbing weight test result of Example 1 for repeating to absorb organic liquid.

4. The absorbing weight test of the modified porous composite structure for repeating to absorb the organic liquid: the modified porous composite structure of Examples is cut into several 1 cm³ cubes for the absorbing weight test of repeating to absorb the n-heptane. The detail steps are described as follows. The modified porous composite structure absorbs the n-heptane until saturated, and then the absorbed n-heptane is pressed out from the modified porous composite structure by two slides. The weight of the modified porous composite structure after the n-heptane is pressed out is defined as $M_1$. Calculation formula is $M_{eff}=(M-M_1)\times 100\%$, wherein $M_{eff}$ represents the absorption efficiency of the modified porous composite structure, M represents the weight of the modified porous composite structure after absorbing the organic liquid (including the weight of the modified porous composite structure and the weight of the absorbed organic liquid), and $M_1$ represents the weight of the modified porous composite structure after the n-heptane is pressed out. The test is conducted for 10 repeats and 10 of $M_{eff}$ value are obtained. The average of all $M_{eff}$ value is calculated, and each $M_{eff}$ value is divided by the average and then multiplied by 100% to obtain the Regeneration Efficiency (%) of each test. FIG. 13 is an absorbing weight test result of Example 1 for repeating to absorb organic liquid, in which the vertical-coordinate represents the Regeneration Efficiency, and the horizontal-coordinate 1-10 represent the test number, that is the used times of Example 1. As shown in FIG. 13, the regeneration efficiency of each test is closed to 100%, showing that after the modified porous composite structure used several times, the modified porous composite structure can keep the similar absorption efficiency as the first use. Additionally, the absorption weight test of Example 2 and Example 3 for repeating to absorb organic liquid is respectively conducted, which the results are similar to that showing in FIG. 13, so it is not showed here again.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

The invention claimed is:

1. A method for manufacturing a modified porous composite structure, comprising:
   providing a functionalized melamine sponge, wherein the functionalized melamine sponge has a repeat unit represented by Formula (i):

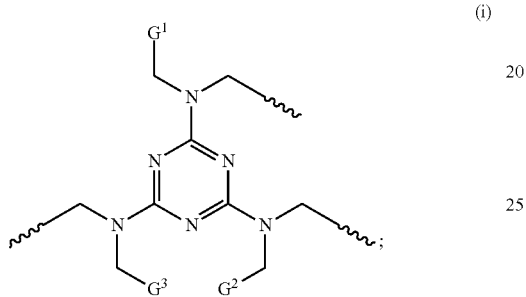

wherein each of $G^1$, $G^2$, $G^3$ independently represents a monovalent organic group comprising alkenyl groups or alkynyl groups;
   providing a porous organic framework source, wherein the porous organic framework source comprises a porous organic framework or a precursor of the porous organic framework, the porous organic framework and the precursor of the porous organic framework comprise a plurality of first ligands, and each of the first ligands comprises at least one tetrazine group;
   conducting a connecting step, wherein at least one of the $G^1$, the $G^2$, and the $G^3$ is reacted with the tetrazine group, so that the functionalized melamine sponge and the porous organic framework are connected, whereby the porous composite structure is obtained; and
   conducting a modifying step, wherein the porous composite structure is mixed with a modifying group donor, the modifying group donor comprises a reactive group and a modifying group, the reactive group is covalently connected to the modifying group, and the reactive group is an alkenyl group, an alkynyl group, an aldehyde group, a ketone group or a combination thereof, the reactive group is reacted with one of the tetrazine groups, so that the modifying group is connected to the porous composite structure to obtain the modified porous composite structure.

2. The method for manufacturing the modified porous composite structure of claim 1, wherein a molecular weight of the functionalized melamine sponge is ranged from 3000 g/mol to 20000 g/mol.

3. The method for manufacturing the modified porous composite structure of claim 1, wherein the porous organic framework is a metal organic framework (MOF) or a covalent organic framework (COF).

4. The method for manufacturing the modified porous composite structure of claim 1, wherein the porous organic framework is a metal organic framework, and each of the first ligands has a structure represented by Formula (I-1), Formula (I-2), Formula (I-3), Formula (I-4) or Formula (I-5):

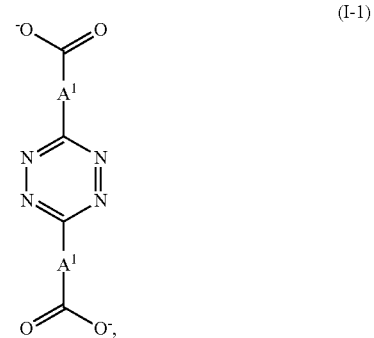

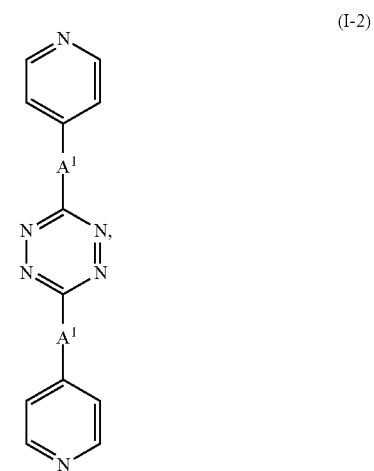

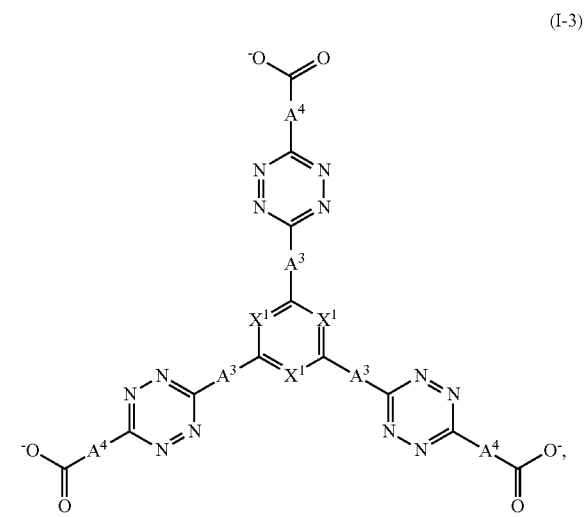

-continued

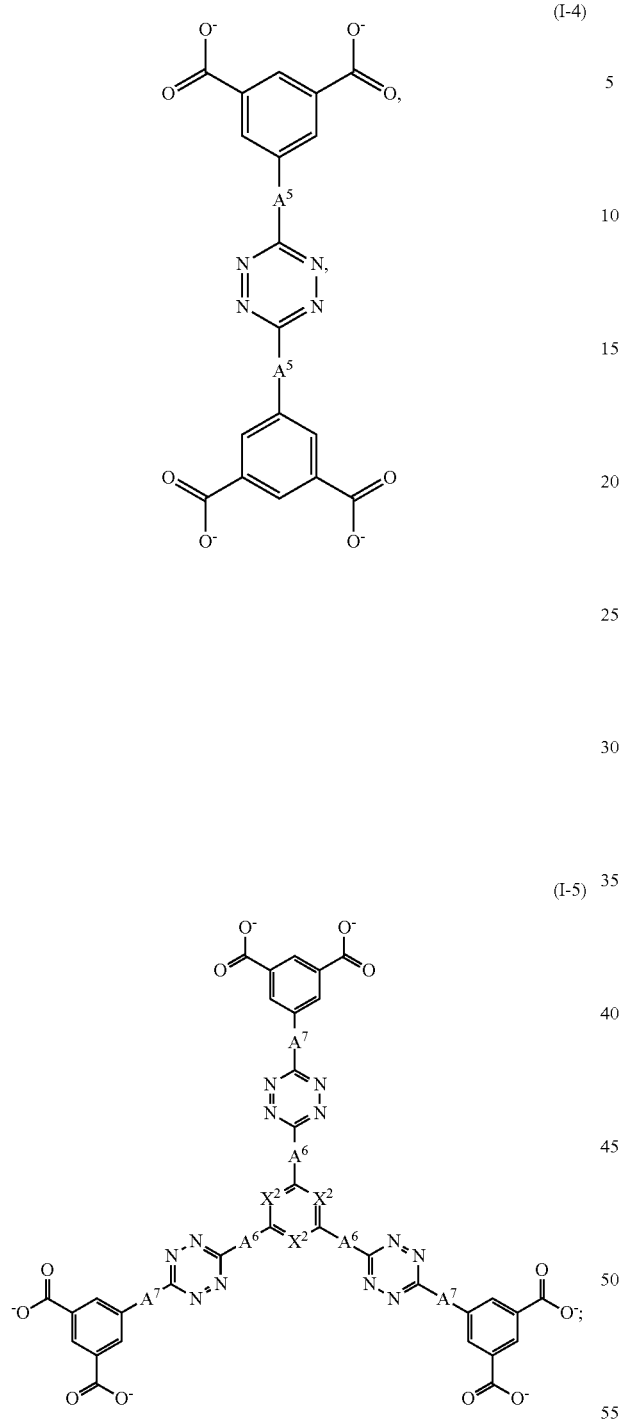

wherein each of $A^1$, $A^2$, $A^3$, $A^4$, $A^5$, $A^6$ and $A^7$ independently represents a single bond or a divalent organic group, and each of $X^1$ and $X^2$ independently represents N or C.

5. The method for manufacturing the modified porous composite structure of claim 1, wherein the porous organic framework is a covalent organic framework, and each of the first ligands is provided by a compound having a structure represented by Formula (II-1), Formula (II-2) or Formula (II-3):

wherein each of $A^8$ independently represents a single bond or a divalent organic group, $A^9$ represents a tetravalent organic group, each of $E^1$, $E^2$ and $E^3$ independently represents $B(OH)_2$, an amino group or an aldehyde group, and each of $X^3$ independently represents N or C.

6. The method for manufacturing the modified porous composite structure of claim 5, wherein the porous organic framework further comprises a plurality of second ligands, one of the second ligands is covalently connected with one of the first ligands, and each of the second ligands is provided by a compound comprising a plurality of hydroxyl groups, a plurality of amino groups or a plurality of aldehyde groups.

7. The method for manufacturing the modified porous composite structure of claim 1, wherein the connecting step is conducted at a temperature ranging from 30° C. to 150° C. for 2 hours to 12 hours.

8. The method for manufacturing the modified porous composite structure of claim 1, wherein the functionalized melamine sponge has the repeat unit represented by Formula (i-1), or Formula (i-2):

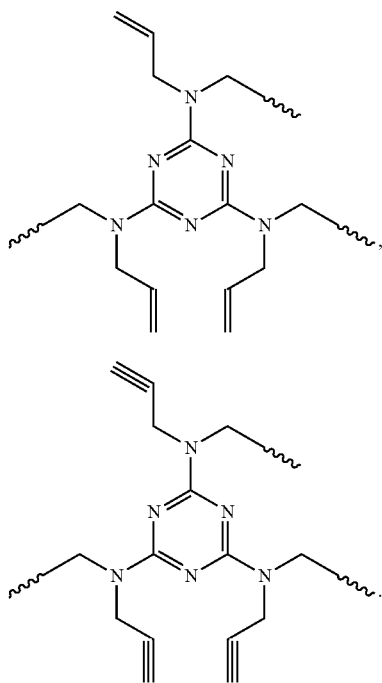

9. The method for manufacturing the modified porous composite structure of claim 1, wherein the porous organic framework is formed by heating a mixture of 4,4'-(1,2,4,5-tetrazine-3,6-diyl)dibenzoic acid, aluminum chloride and N,N-diethylformamide.

10. The method for manufacturing the modified porous composite structure of claim 1, wherein the modifying group donor has a structure represented by Formula (IV-1), Formula (IV-2), or Formula (IV-3):

wherein each of $R^1$, $R^2$, $R^3$, $R^4$, $R^5$ and $R^6$ independently represents H or a $C_1$-$C_{40}$ monovalent organic group.

11. The method for manufacturing the modified porous composite structure of claim 10, wherein each of $R^1$, $R^2$, $R^3$, $R^4$, $R^5$ and $R^6$ independently represents H, a $C_1$-$C_{40}$ alkyl group or a $C_6$-$C_{40}$ phenyl group, at least one H of the $C_1$-$C_{40}$ alkyl group can be substituted by $NH_2$, F, Cl, Br or I, at least one $CH_2$ of the $C_1$-$C_{40}$ alkyl group can be substituted by NH or a carbonyl group, at least one H of the $C_6$-$C_{40}$ phenyl group can be substituted by $NH_2$, F, Cl, Br or I, at least one $CH_2$ of the $C_6$-$C_{40}$ phenyl group can be substituted by NH or a carbonyl group, and CH of a benzene ring of the $C_6$-$C_{40}$ phenyl group can be substituted by N.

12. The method for manufacturing the modified porous composite structure of claim 1, wherein the modifying step is conducted at a temperature ranging from 30° C. to 50° C. for 2 hours to 24 hours.

13. The method for manufacturing the modified porous composite structure of claim 1, wherein the modifying group donor is 1-octadecene.

14. A modified porous composite structure, wherein the modified porous composite structure is manufactured by the method for manufacturing the modified porous composite structure of claim 1.

15. A method for adsorbing organic liquid, comprising:
contacting the modified porous composite structure of claim 14 with an organic liquid, wherein the modified porous composite structure adsorbs the organic liquid.

\* \* \* \* \*